(12) United States Patent
Tang et al.

(10) Patent No.: US 12,371,388 B2
(45) Date of Patent: *Jul. 29, 2025

(54) METHOD FOR MANUFACTURING COMPOSITE FIBER PREFORM FOR DISC BRAKES

(71) Applicant: Honeywell International Inc., Charlotte, NC (US)

(72) Inventors: Long Gui Tang, Granger, IN (US); Stefan Glen, Walkerton, IN (US); Yanmei Piao, South Bend, IN (US); Neil Murdie, Granger, IN (US); Mark C. James, Plymouth, IN (US)

(73) Assignee: Honeywell International Inc., Charlotte, NC (US)

( * ) Notice: Subject to any disclaimer, the term of this patent is extended or adjusted under 35 U.S.C. 154(b) by 427 days.

This patent is subject to a terminal disclaimer.

(21) Appl. No.: 17/407,056

(22) Filed: Aug. 19, 2021

(65) Prior Publication Data

US 2023/0057247 A1    Feb. 23, 2023

(51) Int. Cl.
*B32B 9/00*     (2006.01)
*C04B 35/83*    (2006.01)
*D02G 3/28*     (2006.01)
*D02G 3/38*     (2006.01)
*F16D 69/02*    (2006.01)
(Continued)

(52) U.S. Cl.
CPC .............. *C04B 35/83* (2013.01); *D02G 3/28* (2013.01); *D02G 3/38* (2013.01); *F16D 69/023* (2013.01); *F16D 65/126* (2013.01); *F16D 2069/008* (2013.01); *F16D 2200/0065* (2013.01); *F16D 2200/0082* (2013.01)

(58) Field of Classification Search
CPC ....... Y10T 428/30; B82Y 30/00; B82Y 40/00; C23C 16/26; F16D 65/126; F16D 2200/0082; C04B 35/83
USPC ....................................................... 428/408
See application file for complete search history.

(56) References Cited

U.S. PATENT DOCUMENTS

| 5,348,598 | A |   | 9/1994 | Vives et al. |
| 5,662,855 | A | * | 9/1997 | Liew ..................... D04H 18/02 264/258 |
| 6,083,436 | A |   | 7/2000 | Thompson et al. |

(Continued)

FOREIGN PATENT DOCUMENTS

| CN | 105696202 A | 6/2016 |
| CN | 106142561 A | 11/2016 |

(Continued)

OTHER PUBLICATIONS

Extended Search Report from counterpart European Application No. 22188489.3 dated Dec. 21, 2022, 9 pp.

(Continued)

*Primary Examiner* — Daniel H Miller
(74) *Attorney, Agent, or Firm* — Shumaker & Sieffert, P.A.

(57) ABSTRACT

An example method includes forming an interlayer on a carbon fiber fabric to form a composite fiber fabric. The interlayer comprises a binder. The method further includes winding the composite fiber fabric around a core to form a composite fiber preform comprising a plurality of layers defining an annulus extending along a central axis. The method further includes densifying the composite fiber preform.

15 Claims, 11 Drawing Sheets

(51) Int. Cl.
*F16D 65/12* (2006.01)
*F16D 69/00* (2006.01)

(56) References Cited

U.S. PATENT DOCUMENTS

| | | | |
|---|---|---|---|
| 6,129,122 A | 10/2000 | Bilisik | |
| 6,183,583 B1 | 2/2001 | Duval et al. | |
| 6,722,228 B1 | 4/2004 | Wilkinson et al. | |
| 6,767,602 B1 | 7/2004 | Duval et al. | |
| 8,757,958 B2 | 6/2014 | Lussier | |
| 8,926,933 B2 | 1/2015 | Zhang et al. | |
| 9,574,300 B2 | 2/2017 | Shah et al. | |
| 9,926,201 B1 | 3/2018 | Kessler et al. | |
| 10,035,305 B2* | 7/2018 | La Forest | B28B 1/001 |
| 10,457,016 B2 | 10/2019 | La Forest et al. | |
| 10,632,353 B2 | 4/2020 | Mordasini et al. | |
| 2002/0056782 A1 | 5/2002 | Gabrys | |
| 2004/0037984 A1 | 2/2004 | Ueda et al. | |
| 2004/0074075 A1 | 4/2004 | James et al. | |
| 2006/0071373 A1 | 4/2006 | Bauer et al. | |
| 2010/0037441 A1 | 2/2010 | Lescostaouec | |
| 2010/0065389 A1 | 3/2010 | Gilboy et al. | |
| 2010/0223766 A1* | 9/2010 | Wall, III | B32B 5/06 28/107 |
| 2013/0251973 A1* | 9/2013 | Crawford | D04B 21/20 428/222 |
| 2014/0150920 A1 | 6/2014 | Les Costaouec | |
| 2016/0116010 A1 | 4/2016 | Valle et al. | |
| 2016/0332881 A1 | 11/2016 | Troester et al. | |
| 2017/0151712 A1 | 6/2017 | La Forest et al. | |
| 2017/0190629 A1* | 7/2017 | Lakrout | F16D 69/023 |
| 2017/0283330 A1 | 10/2017 | Fryska et al. | |
| 2017/0328429 A1 | 11/2017 | Valle | |
| 2019/0210251 A1 | 7/2019 | Fabre et al. | |
| 2019/0219120 A1* | 7/2019 | Leonard | F16D 69/02 |
| 2019/0375185 A1 | 12/2019 | Kratzer et al. | |
| 2020/0406672 A1 | 12/2020 | Denmead et al. | |
| 2021/0102590 A1 | 4/2021 | Shula | |
| 2021/0102591 A1 | 4/2021 | Shula et al. | |

FOREIGN PATENT DOCUMENTS

| | | |
|---|---|---|
| CN | 107076235 A | 8/2017 |
| CN | 107119390 A | 9/2017 |
| CN | 109208185 A | 1/2019 |
| CN | 109641371 A | 4/2019 |
| DE | 69213103 T2 | 4/1997 |
| EP | 2955260 A1 | 12/2015 |
| EP | 2531558 B1 | 8/2018 |
| EP | 3616899 A1 | 3/2020 |
| EP | 3804967 A1 | 4/2021 |
| GB | 2177431 A | 1/1987 |
| GB | 2489076 A | 9/2012 |
| JP | H0378503 A | 4/1991 |
| JP | 2019051594 A | 4/2019 |
| WO | 2007007045 A1 | 1/2007 |
| WO | 2010003494 A1 | 1/2010 |
| WO | 2012114061 A1 | 8/2012 |

OTHER PUBLICATIONS

Office Action from U.S. Appl. No. 17/407,024 dated Dec. 21, 2022, 7 pp.
Cirino et al., "The Effect of Fiber Orientation on the Abrasive Wear Behavior of Polymer Composite Materials," Jun. 30, 1987, 15 pp.
Mohan et al., "Performance of 3-D Polar Weave Carbon-Carbon Composites in High Thermal Erosive Environment," International Journal of Mechanical Engineering and Technology (IJMET), ISSN Print: 0976-6340, vol. 8, Issue 3, Mar. 2017, 10 pp.
Liu et al., "Producing superior composites by winding carbon nanotubes onto a mandrel under a poly(vinyl alcohol) spray", Elsevier, vol. 49, Available online Jun. 30, 2011, pp. 4786-4791.
Response to Extended Search Report dated Dec. 21, 2022, from counterpart European Application No. 22188489.3 filed Feb. 20, 2023, 10 pp.
Response to Office Action dated Dec. 21, 2022 from U.S. Appl. No. 17/407,024, filed Mar. 21, 2023, 8 pp.
Advisory Action from U.S. Appl. No. 17/407,024 dated Sep. 13, 2023, 3 pp.
Response to Final Office Action dated Jun. 15, 2023 from U.S. Appl. No. 17/407,024, filed Aug. 15, 2023, 10 pp.
Office Action from U.S. Appl. No. 17/407,024 dated Sep. 28, 2023, 9 pp.
Final Office Action from U.S. Appl. No. 17/407,024 dated Jun. 15, 2023, 9 pp.
U.S. Appl. No. 17/407,024, filed Aug. 19, 2021, naming inventors Glen et al.
Response to Office Action dated Sep. 28, 2023 from U.S. Appl. No. 17/407,024, filed Dec. 27, 2023, 10 pp.
Final Office Action from U.S. Appl. No. 17/407,024 dated Mar. 14, 2024, 9 pp.
Response to Final Office Action dated Mar. 14, 2024 from U.S. Appl. No. 17/407,024, filed May 14, 2024.
Notice of Allowance from U.S. Appl. No. 17/407,024 dated Sep. 27, 2024, 7 pp.
Notice of Allowance from U.S. Appl. No. 17/407,024 dated Jun. 20, 2024, 7 pp.
Response to Final Office Action dated Mar. 14, 2024 from U.S. Appl. No. 17/407,024, filed May 14, 2024, 7 pp.

* cited by examiner

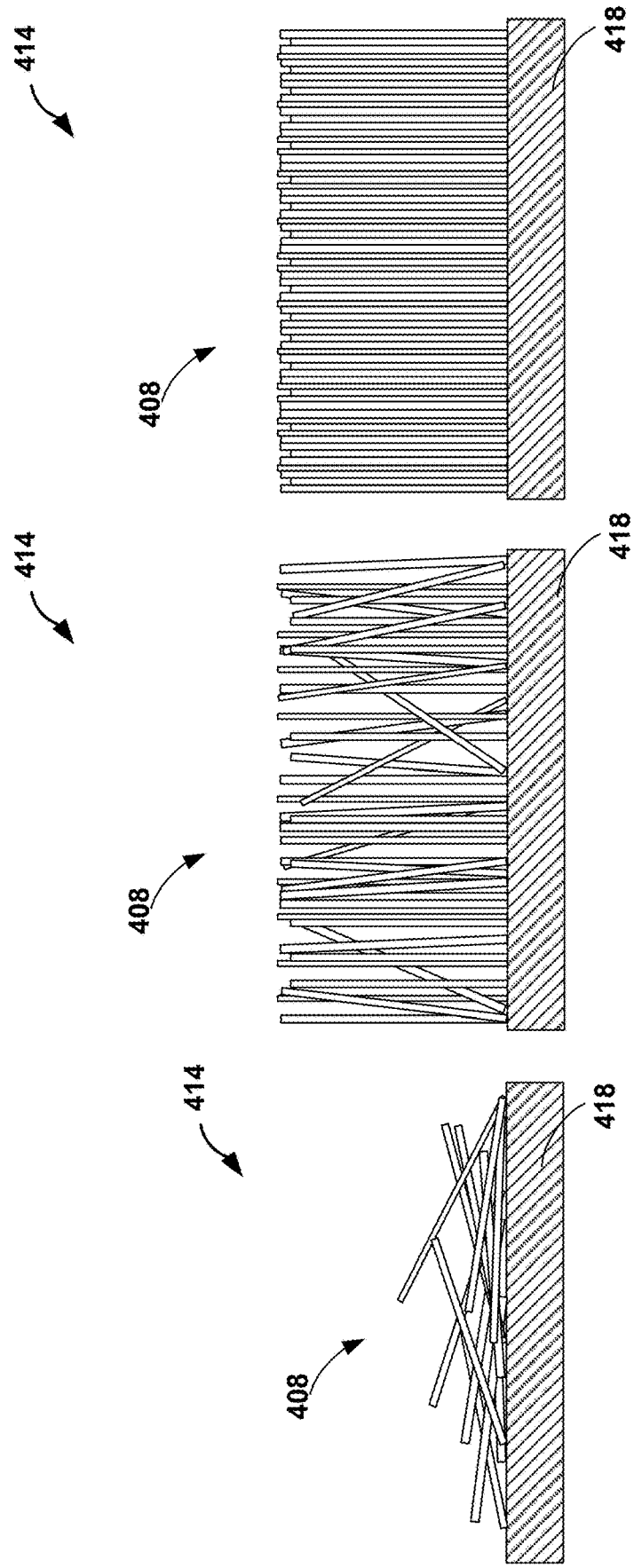

METHOD FOR MANUFACTURING COMPOSITE FIBER PREFORM FOR DISC BRAKES

TECHNICAL FIELD

The disclosure relates to the manufacture of carbon-carbon composite materials, such as the manufacture of aircraft brake pads or discs made of carbon-carbon composite materials.

BACKGROUND

Carbon-carbon composite materials are composite materials that include a carbon matrix and carbon fiber reinforcements. Carbon-carbon (C—C) composite components can be used in many high temperature applications. For example, the aerospace industry employs C—C composite components as friction materials for commercial and military aircraft, such as friction brake materials.

Some carbon-carbon composites, such as some carbon-carbon composite brake discs that are used in the aerospace industry, may be manufactured from porous preforms that include layers of carbon fiber, which may be densified using one or more of several processes, including chemical vapor deposition/chemical vapor infiltration (CVD/CVI), vacuum/pressure infiltration (VPI), or resin transfer molding (RTM), to infiltrate the porous preform with carbon.

SUMMARY

In some examples, this disclosure describes a method including combining an interlayer and a carbon fiber fabric, wherein the interlayer comprises a highly oriented milled carbon fiber ply comprising a plurality of out-of-plane carbon fibers; winding the interlayer and the carbon fiber fabric around a core to form a composite fiber preform comprising a plurality of layers defining an annulus extending along a central axis; and densifying the composite fiber preform.

In some examples, this disclosure describes a composite fiber preform including a carbon fiber fabric; and an interlayer comprising a highly oriented milled carbon fiber ply comprising a plurality of out-of-plane carbon fibers, wherein the interlayer and the carbon fiber fabric are wound around a core to form a composite fiber preform comprising a plurality of layers defining an annulus extending along a central axis, wherein the interlayer and the carbon fiber fabric are at least partially densified.

In some examples, this disclosure describes a system including a fabric source including a carbon fiber fabric; an interlayer source comprising an interlayer comprising a plurality of out-of-plane carbon fibers; and a winding apparatus configured to wind the carbon fiber fabric and the interlayer around a core to form a composite fiber preform and defining an annulus extending along a central longitudinal axis, the composite fiber preform including: a plurality carbon fiber fabric layers extending in an axial direction parallel with the longitudinal axis and a circumferential direction perpendicular to both the radial and axial directions, wherein each of the plurality of carbon fiber fabric layers comprises a plurality of elongate carbon fibers oriented substantially parallel with the axial and circumferential directions; and a plurality interlayers extending in an axial direction parallel with the longitudinal axis and a circumferential direction perpendicular to both the radial and axial directions, wherein the plurality of out-of-plane carbon fibers of interlayers are oriented substantially parallel with the radial direction and configured to mechanically bind one or more adjacent carbon fiber fabric layers.

In some examples, this disclosure describes a method including: forming an interlayer on a carbon fiber fabric to form a composite fiber fabric, wherein the interlayer comprises a binder; winding the composite fiber fabric and interlayer around a core to form a composite fiber preform comprising a plurality of layers defining an annulus extending along a central axis; and densifying the composite fiber preform.

In another example, this disclosure describes a composite fiber preform including: a plurality carbon fiber fabric layers wrapped circumferentially about a longitudinal axis and extending in an axial direction parallel with the longitudinal axis, wherein each of the plurality of carbon fiber fabric layers comprises a plurality of elongate carbon fibers; and a plurality interlayers wrapped circumferentially about the longitudinal axis and extending in the axial direction, wherein each of the plurality of interlayers are disposed between successive layers of the plurality of carbon fabric layers and comprise a binder configured to mechanically bind one or more adjacent carbon fiber fabric layers.

In another example, this disclosure describes a system including: a fabric source including a carbon fiber fabric; an interlayer source; and a winding apparatus configured to wind the carbon fiber fabric and the interlayer around a core to form a composite fiber preform and defining an annulus extending along a central longitudinal axis, the fiber preform including: a plurality carbon fiber fabric layers extending in an axial direction parallel with the longitudinal axis and a circumferential direction perpendicular to both the radial and axial directions, wherein each of the plurality of carbon fiber fabric layers comprises a plurality of elongate carbon fibers; and a plurality interlayers extending in an axial direction parallel with the longitudinal axis and a circumferential direction perpendicular to both the radial and axial directions, wherein the interlayer comprises a binder configured to mechanically bind one or more adjacent carbon fiber fabric layers.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIG. 5A is a cross-section of an example interlayer that may be used to manufacture the composite friction materials described herein.

FIG. 5B is a cross-section of another example interlayer that may be used to manufacture the composite friction materials described herein.

FIG. 5C is a cross-section of another example interlayer that may be used to manufacture the composite friction materials described herein.

DETAILED DESCRIPTION

Figure 1:
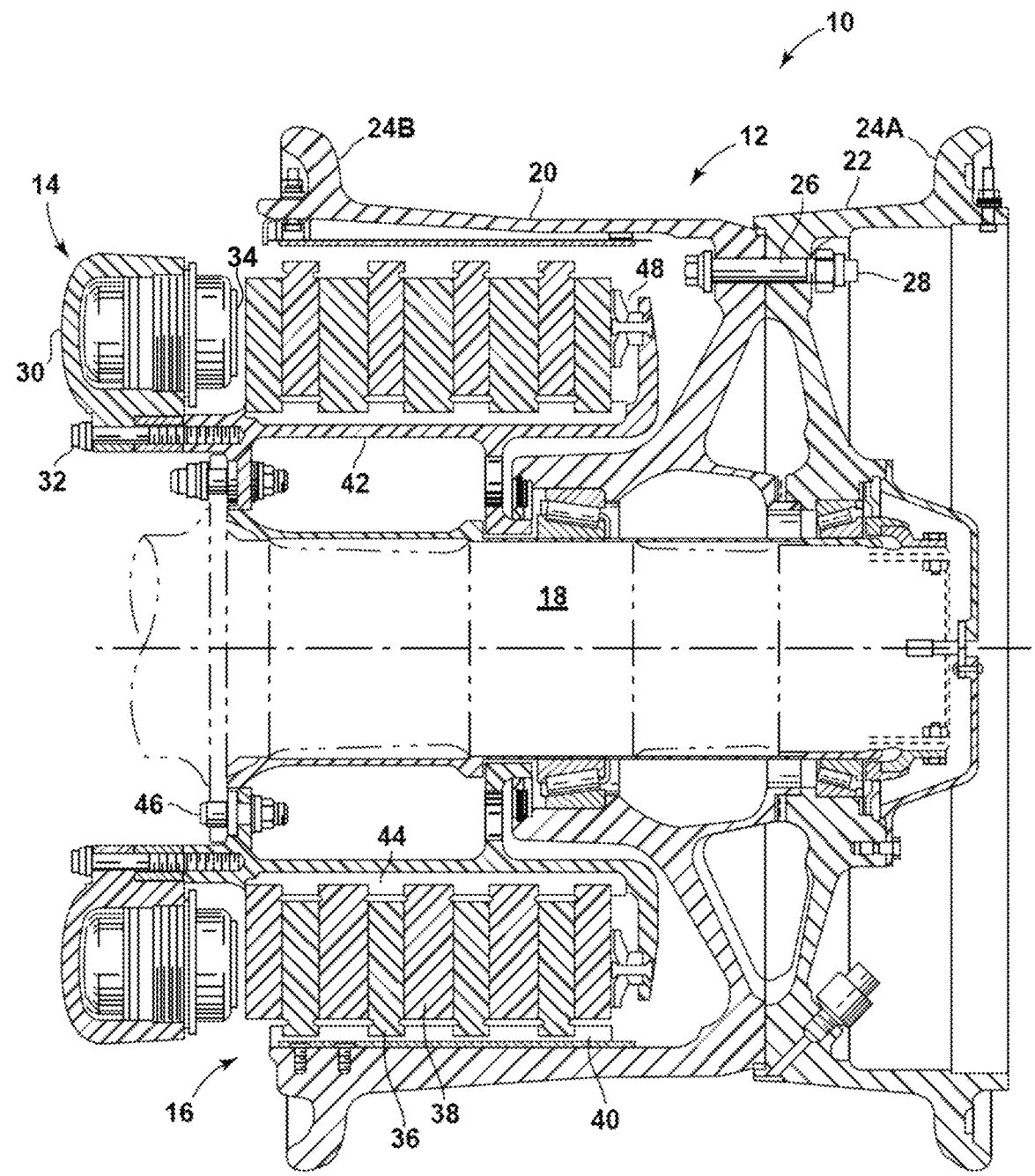
FIG. 1 is a conceptual diagram illustrating an example wheel and brake assembly that may include one or more of brake discs formed in accordance with the techniques and structural features of this disclosure.

The present disclosure describes, in some examples, a composite friction material and methods of manufacturing a composite friction material that may be used, for example, to form a carbon-carbon composite brake disc or other carbon-carbon composite brake pad. Methods of manufacturing the carbon-carbon composite friction material may include winding a carbon fiber-based fabric and an interlayer onto a core or a mandrel to form a composite fiber preform. The layers of the composite fiber preform may be arranged in concentric layers, e.g., wound into an annulus and/or a cylinder extending along a central longitudinal axis. The carbon fibers (e.g., alternatively referred to as just "fibers" throughout) within the layers may be orientated predominately in the axial and circumferential directions of the wound cylinder.

Composite friction materials, such as composite aircraft brake pads, may wear during braking operations. In the example of aircraft brakes, increasing the usable life of the brake pads may be accomplished by increasing a wear pin length, decreasing a wear rate of the friction material, or both. Often, the wear pin is already at a maximum length. Hence, decreasing wear rate of a brake pad may be beneficial. Fiber orientation in composite brake pads may affect wear rates and thermal conductivity. In some examples, preforms used to form composite aircraft brake pads in the form of annular brake discs may include alternating layers of radial and chordal (e.g., circumferential) fiber fabric segments, such that a majority of the fibers lie in the radial and circumferential directions of the brake disc, e.g., substantially within a plane perpendicular to the axial direction of the annular disc. Needling of the fiber segments of the preform may be used to introduce a relatively low percentage of fibers in the axial direction. Typically, needling or tufting is used to provide mechanical stability in an axially compacted state for handling in subsequent steps and to provide adequate fiber volume fraction.

Orienting a relatively large amount of fibers of a composite friction material in an axial direction relative to the longitudinal axis of an annulus defined by the disc brake, for example, normal to a friction surface, may decrease wear rate, increase thermal conductivity (in the axial direction), and increase useable life of the composite friction material. Additionally or alternatively, axial orientation of the fibers may improve thermal conductivity from the friction surface to heatsinks, such as a backing plate. For example, by better conducting heat, the axially oriented fibers may lower peak temperatures and/or reduce time at temperature exposure during operation, which may increase a useable life of the friction material and/or an antioxidant coating on the friction material. Additionally or alternatively, axial orientation of fibers may improve mid-disc densification via chemical vapor infiltration or chemical vapor deposition (CVI/CVD) process by providing preferentially-oriented fibers, which may reduce density gradients, potentially increase bulk density leading to lower bulk temperatures, and/or potentially reduce the number of CVI/CVD cycles to achieve required density.

According to techniques of the current disclosure, an interlayer may be wound with a carbon fiber fabric around a core, e.g., via a winding apparatus and/or onto a mandrel, to form a preform. As will be described, the use of the interlayer may provide for attachment and/or adhesion between successive windings and/or layers in the radial direction within the preform, e.g., in order to provide a desired mechanical stability of the wound fabric. In some examples, interlayer may be selected to provide a desired radially oriented fiber content to provide a desired interlayer attachment and/or mechanical stability of the wound fabric, e.g., which may eliminate or reduce the need for needling/tufting of the preform. In other examples, the interlayer may be selected to provide a desired binding and/or adhesion force to provide the desired mechanical stability of the wound fabric. The carbon fabric may be selected to consolidate during winding, e.g., by controlling tension, to increase the fiber volume fraction within the preform. Additionally, the carbon fiber fabric may comprise fibers that are relatively more evenly dispersed, e.g., relative to conventional carbon fiber fabrics bundled in tows. The relatively more even dispersal of fibers may improve infiltration/densification of the preform in subsequent processing steps.

In example methods and systems disclosed herein, a composite fiber preform may be formed by combining an interlayer and a carbon fiber fabric. The interlayer may include a highly oriented milled carbon fiber ply that includes a plurality of out-of-plane (or radial when wound) carbon fibers. The interlayer and the carbon fiber fabric may be wound around a core to form the composite fiber preform including a plurality of layers defining an annulus extending along a central axis. The composite fiber preform may then be densified.

In some examples, the carbon ply may be deposited onto the carbon fiber fabric from a peel ply. For example, the carbon ply may be disposed on a peel-ply prior to winding, and during winding the peel-ply may be merged with the carbon fiber fabric to deposit the highly oriented milled carbon fiber on a surface of the carbon fiber fabric. Subsequently, the peel-ply backing may be removed, e.g., prior to winding of the carbon ply and carbon fiber fabric. In some examples, the carbon fiber fabric may comprise a carbon felt, as further described below.

In another example, the interlayer may include a binder rather than a carbon fiber ply. The interlayer, e.g., binder, may be formed on the carbon fiber fabric to form a composite fiber fabric. The composite fiber fabric, e.g., carbon fiber fabric and binder, may be wound around a core to form the composite fiber preform including a plurality of layers defining an annulus extending along a central axis. The composite fiber preform may then by densified.

In some examples, a plurality of nanoparticles may be combined with, or included with, the binder. The plurality of nanoparticles may be carbon nanotubes, carbon nanofibers, graphene nanoplatelets, and the like. The binder may include any suitable binder configured to bind and/or cause successive windings of the composite fiber fabric to adhere. In some examples, the binder may be a resin, a thermoset resin, a phenolic resin, and the like. In some examples, the binder may be configured to include and/or mix with the nanoparticles. The binder, optionally including the plurality of nanoparticles, may be deposited on the carbon fiber fabric as a dry coating, a dry powder, a solution, or any suitable depositing method.

FIG. 1 is a conceptual diagram illustrating an example wheel and brake assembly 10 that may include one or more of brake pads or discs formed in accordance with the techniques and structural features of this disclosure. For ease of description, examples of the disclosure will be described primarily with regard to composite friction materials in the form of brake discs that may be employed in aircraft brake assemblies such as that shown in FIG. 1. However, the techniques of this disclosure may be used to form composite friction materials other than aircraft brake discs. For example, the composite friction materials may be used in other types of vehicles or friction material applications from which they may benefit, e.g., improved wear rate and/or improved thermal conductivity.

In the example of FIG. 1, wheel and brake assembly 10 includes a wheel 12, an actuator assembly 14, a brake stack 16, and an axle 18. Wheel 12 includes wheel hub 20, wheel outrigger flange 22, bead seats 24A and 24B, lug bolt 26, and lug nut 28. Actuator assembly 14 includes actuator housing 30, actuator housing bolt 32, and piston 34. Brake stack 16 includes alternating rotor brake discs 36 and stator brake discs 38; rotor brake discs 36 are configured to move relative to stator brake discs 38. Rotor brake discs 36 are mounted to wheel 12, and in particular wheel hub 20, by beam keys 40. Stator brake discs 38 are mounted to axle 18, and in particular torque tube 42, by splines 44. Wheel and brake assembly 10 may support any variety of private, commercial, or military aircraft or other type of vehicle.

Wheel and brake assembly 10 includes wheel 12, which in the example of FIG. 1 is defined by a wheel hub 20 and a wheel outrigger flange 22. Wheel outrigger flange 22 may be mechanically affixed to wheel hub 20 by lug bolts 26 and lug nuts 28. Wheel 12 defines bead seals 24A and 24B. During assembly, an inflatable tire (not shown) may be placed over wheel hub 20 and secured on an opposite side by wheel outrigger flange 22. Thereafter, lug nuts 28 can be tightened on lug bolts 26, and the inflatable tire can be inflated with bead seals 24A and 24B providing a hermetic seal for the inflatable tire.

Wheel and brake assembly 10 may be mounted to a vehicle via torque tube 42 and axle 18. In the example of FIG. 1, torque tube 42 is affixed to axle 18 by a plurality of bolts 46. Torque tube 42 supports actuator assembly 14 and stator brake discs 38. Axle 18 may be mounted on a strut of a landing gear (not shown) or other suitable component of the vehicle to connect wheel and brake assembly 10 to the vehicle.

During operation of the vehicle, braking may be necessary from time to time, such as during landing and taxiing procedures of an aircraft. Wheel and brake assembly 10 is configured to provide a braking function to the vehicle via actuator assembly 14 and brake stack 16. Actuator assembly 14 includes actuator housing 30 and piston 34. Actuator assembly 14 may include different types of actuators such as one or more of, e.g., an electrical-mechanical actuator, a hydraulic actuator, a pneumatic actuator, or the like. During operation, a piston 34 may extend away from actuator housing 30 to axially compress brake stack 16 against compression point 48 for braking.

Brake stack 16 includes alternating rotor brake discs 36 and stator brake discs 38. Rotor brake discs 36 are mounted to wheel hub 20 for common rotation by beam keys 40. Stator brake discs 38 are mounted to torque tube 42 by splines 44. In the example of FIG. 1, brake stack 16 includes four rotors and five stators. However, a different number of rotors and/or stators may be included in brake stack 16 in other examples.

Rotor brake discs 36 and stator brake discs 38 may provide opposing friction surfaces for braking an aircraft. As kinetic energy of a moving aircraft is transferred into thermal energy in brake stack 16, temperatures may rapidly increase in brake stack 16. As such, rotor brake discs 36 and stator brake discs 38 that form brake stack 16 may include robust, thermally stable materials capable of operating at very high temperatures.

Rotor brake discs 36 and stator brake discs 38 may be examples of carbon-carbon composite brake pads. In one example, rotor brake discs 36 and/or stator brake discs 38 are formed as a carbon-carbon (C—C) composite in the form of an annulus that defines a set of opposing wear surfaces. The C—C composite may be fabricated using any suitable manufacturing technique or combination of techniques including, for example, vacuum pressure infiltration (VPI), resin transfer molding (RTM), chemical vapor infiltration (CVI), chemical vapor deposition (CVD), additive manufacturing, mechanical machining, ablation techniques, or the like using the fiber preforms describe herein as the starting substrate.

In some examples, rotor brake discs 36 and stator brake discs 38 may be mounted in wheel and brake assembly 10 by beam keys 40 and splines 44, respectively. In some examples, beam keys 40 may be circumferentially spaced about an inner portion of wheel hub 20. Beam keys 40 may, for example, be shaped with opposing ends (e.g., opposite sides of a rectangular) and may have one end mechanically affixed to an inner portion of wheel hub 20 and an opposite end mechanically affixed to an outer portion of wheel hub 20. Beam keys 40 may be integrally formed with wheel hub 20 or may be separate from and mechanically affixed to wheel hub 20, e.g., to provide a thermal barrier between rotor brake discs 36 and wheel hub 20. In some examples, wheel and brake assembly 10 may include a heat shield (not shown) that extends out radially and outwardly surrounds brake stack 16, e.g., to limit thermal transfer between brake stack 16 and wheel 12.

In some examples, splines 44 may be circumferentially spaced about an outer portion of torque tube 42. As such, stator brake discs 38 may include a plurality of radially inwardly disposed lug notches along an inner diameter of the brake disc configured to engage with splines 44. Similarly, rotor brake discs 36 may include a plurality of radially inwardly disposed lug notches along an outer diameter of the brake disc configured to engage with beam keys 40. As such rotor brake discs 36 will rotate with the motion of the wheel while stator brake discs 38 remain stationary allowing the friction surfaces of an adjacent stator brake disc 38 and rotor brake disc 36 to engage with one another to deaccelerate the rotation of wheel 12.

As will be described further below, one or more of brake discs 36, 38 may be a carbon-carbon composite material formed using one or more of the techniques described herein. In some examples, brake discs 36, 38 may be formed via sectioning a composite carbon fiber preform in a roll format, e.g., after further processing such as densification, carbonization, and/or other processing steps. For example, the composite carbon fiber preform may be formed via winding a carbon fiber fabric such that in-plane fibers of the carbon fiber fabric are re-oriented in an axial-circumferential plane of brake discs 36, 38 after sectioning.

Figure 2:
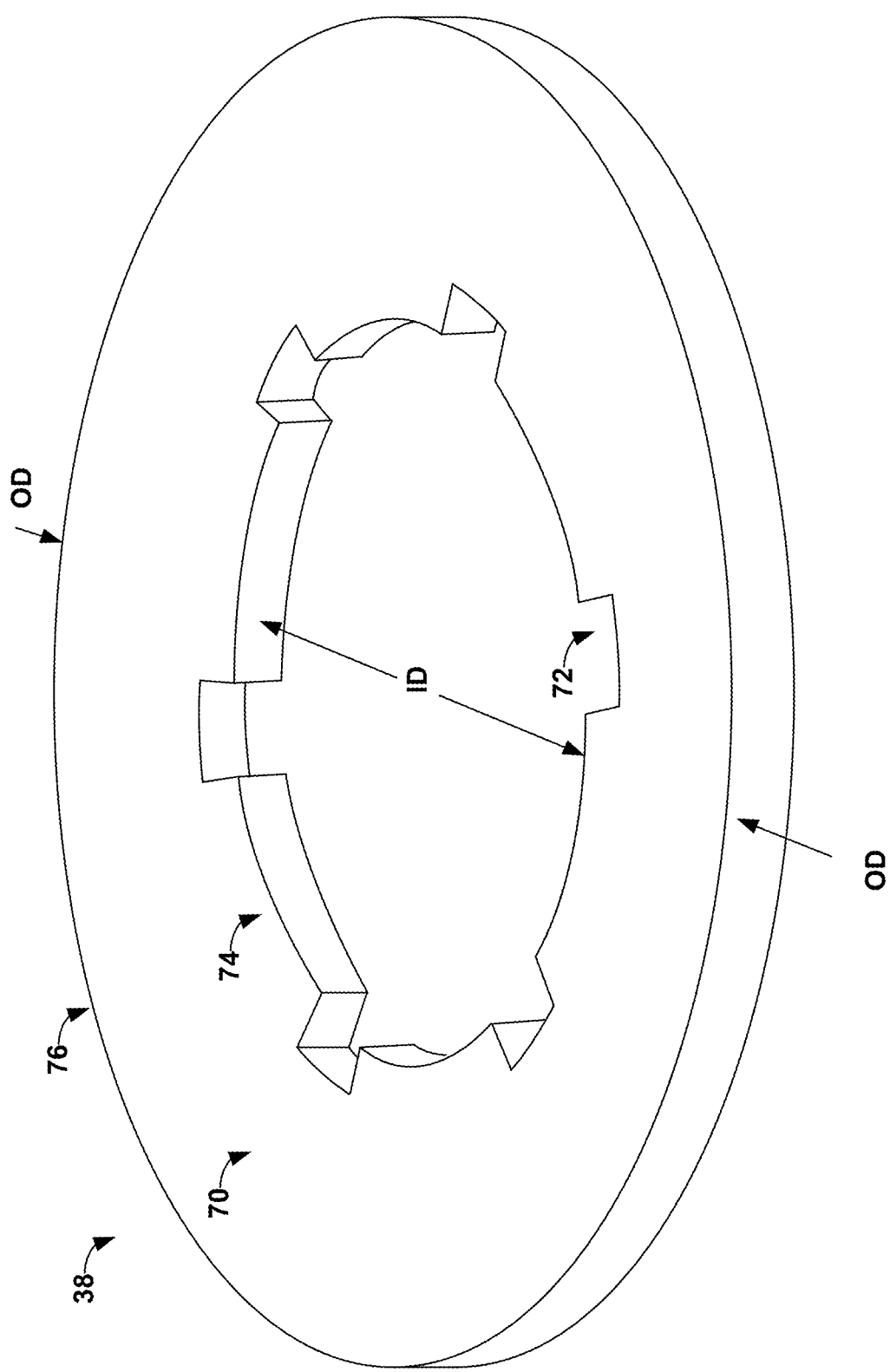
FIG. 2 is a schematic perspective view of an example stator brake disc that defines both an inner diameter (ID) and an outer diameter (OD).

FIG. 2 is a schematic perspective view of an example stator brake disc 38 that defines both an inner diameter (ID) and an outer diameter (OD). Stator brake disc 38 may be an example of the similarly numbered brake discs 38 of FIG. 1. Stator brake disc 38 includes opposing friction surfaces 70 positioned on opposite sides of the annulus. An inner radial section 74 along inner diameter ID of stator brake disc 38 includes a plurality of lug notches 72 cut into stator brake disc 38. Lug notches 72 are configured to engage and interlink with splines 44 of wheel and brake assembly 10. For a rotor brake disc 36, lug notches 72 would occur along an outer radial section 76 along outer diameter OD of the annulus. Lug notches 72 of a rotor brake disc 36 would be configured to engage and interlink with beam keys 40.

During a braking procedure, splines 44 and beam keys 40 may engage with the respective lug notches 72 of rotor and stator brakes discs 36 and 38 generating heat between adjacent friction surfaces 70 and transferring a large amount of torque into the brake discs. Heat generated during the braking procedure may be conducted through fibers of brake disc 38. In some examples, an orientation of the underlying fiber architecture of the C—C composite may affect heat conduction. For example, heat conduction may be greater parallel to the longitudinal length of the fibers, compared to a direction transverse to the longitudinal length of the fibers. In some examples, fibers of the C—C composite that are oriented in an axial direction (relative to the circumferential direction or the radial direction), may conduct more heat between friction surfaces 70 and/or toward the core (in the axial direction) of brake disc 38 (e.g., away from friction surface 70 in the axial direction) than fibers oriented in the circumferential direction or the radial direction. Transferring heat between adjacent friction surfaces and/or toward the core of brake disc 38 may reduce localized build-up of heat, which may otherwise increase wear, damage protective coatings, and/or reduce the useable life of brake disc 38. In this way, fiber architectures of brake discs 36 and 38 may be selected to decrease wear rate, increase thermal conductivity in the axial direction, and increase useable life of the composite friction material.

Additionally, the torque forces created during the braking procedure may be transferred into the underlying fiber architecture of the C—C composite. In some examples, if the fibers of the C—C composite are oriented in a radial direction, the resultant forces may be exerted in a direction generally transverse to the longitudinal length of the fibers. In contrast, if the fibers are oriented in a circumferential direction (e.g., aligned perpendicular to the radial direction), the resultant forces may be exerted in a direction generally along the longitudinal length of the fibers. Fiber architectures of brake discs 36 and 38 may be selected to provide a desired torque transfer near lug notches 72.

According to some techniques described herein, stator brake disc 38 may be formed via sectioning a composite carbon fiber preform in a roll format, e.g., after further processing such as densification, carbonization, and/or other processing steps. For example, the composite carbon fiber preform may be formed via winding a carbon fiber fabric such that in-plane fibers of the carbon fiber fabric are in an axial-circumferential plane of stator brake disc 38 after sectioning.

Figure 3A:
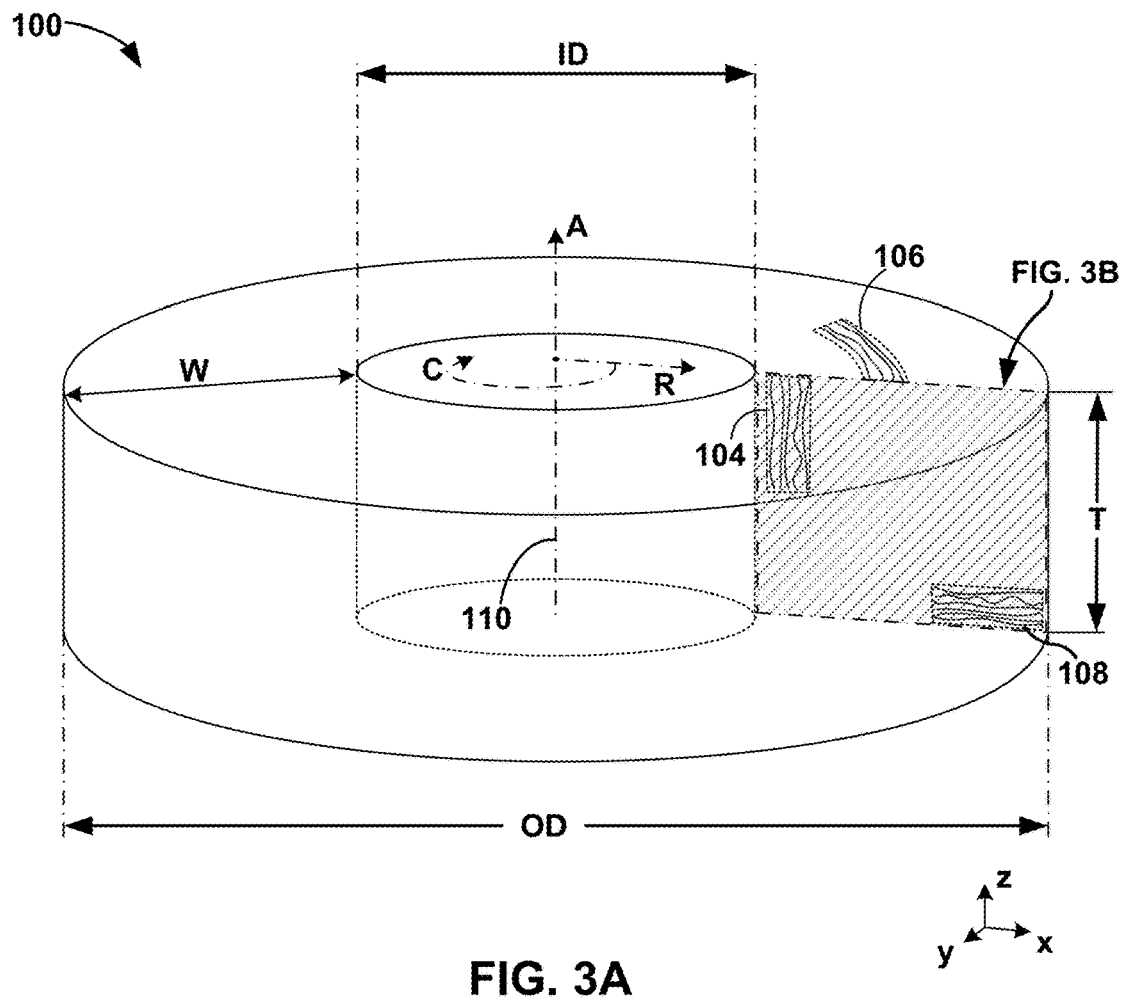
FIG. 3A is a schematic perspective view of an example composite fiber preform that may be used to manufacture the composite friction materials described herein.
Figure 3B:
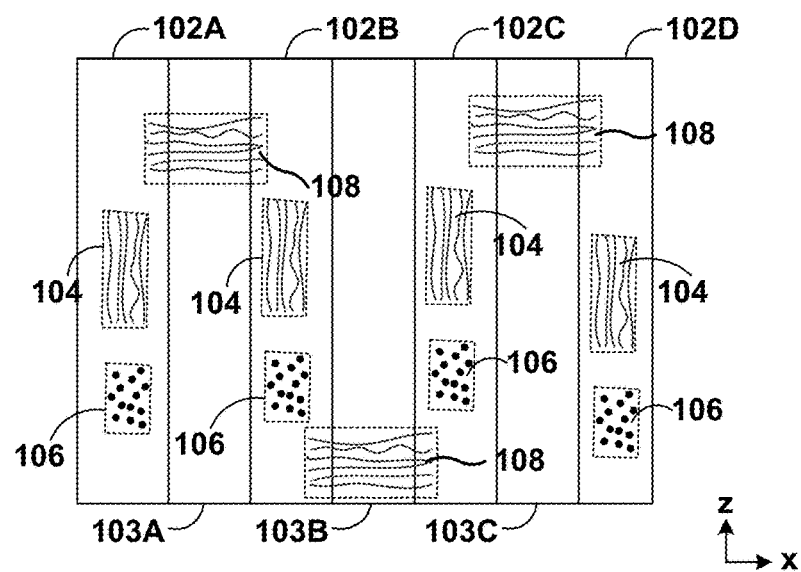
FIG. 3B is a partial cross-section of a portion of the composite fiber preform as indicated in FIG. 3A.
Figure 3C:
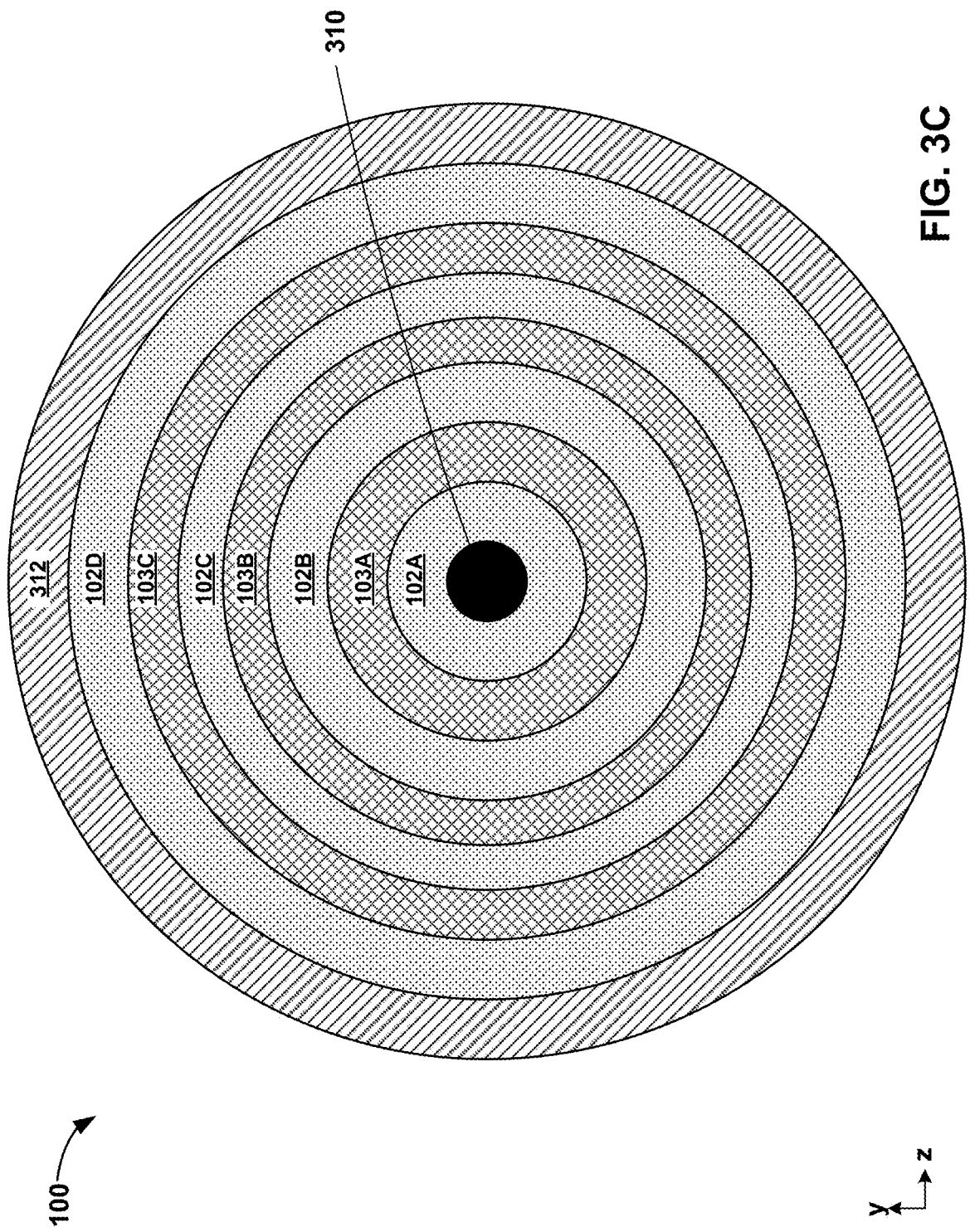
FIG. 3C is a cross-section of the composite fiber preform that may be used to manufacture the composite friction materials described herein.

FIG. 3A is a schematic perspective view of an example composite fiber preform 100 that may be formed according to the techniques disclosed herein and may be used to manufacture the composite friction materials described herein (e.g., rotor or stator brake discs 36 and 38 of FIGS. 1 and 2). FIG. 3B is a partial cross-section of composite fiber preform 100 (the cross-section is indicated in FIG. 3A). FIG. 3C is a cross-section of composite fiber preform 100 as viewed along its axis, e.g., central longitudinal axis 110, including compaction layer 312 and core 310. Composite fiber preform 100 defines an annulus extending along a central longitudinal axis 110 (e.g., extending parallel to the z-axis). Composite fiber preform 100 includes a plurality of superposed fibrous layers 102 ("layers 102") and interlayers ("layers 103"). Layers 102 and interlayers 103 extend in an axial direction "A" and a circumferential direction "C" relative to the longitudinal axis. As illustrated in FIG. 3B, layers 102 include layers 102A-102E wound around longitudinal axis 110, and interlayers 103 include interlayers 103A-103D wound around longitudinal axis 110 and disposed between respective layers 102 as shown. For example, layers 102 and interlayers 103 may be combined and continuously wound around longitudinal axis 110, e.g., in a continuous spiral. In other examples, layers 102 and interlayers 103 may include discrete rings. As described below, layers 102 may include carbon fibers or carbon precursor fibers and layers 102 may be referred to as carbon fiber fabric layers.

In some examples, layers 102 may include a continuous fiber fabric, such as a uniaxial fabric or a biaxial fabric. For example, each of layer 102 may include a plurality of continuous axial fibers 104 ("axial fibers 104") extending substantially in the axial direction and a plurality of continuous circumferential fibers 106 ("circumferential fibers 106") extending substantially in the circumferential direction. As used herein, extending substantially in the axial, circumferential, or radial directions may refer to extending in the respective direction relative to longitudinal axis 110 (e.g., relative to the annulus) to the extent allowable given composite fiber manufacturing tolerances, e.g., deviations not exceeding +/−5 degrees, such as +/−2 degrees. Continuous fibers may include infinitely long fibers that are continuous at least across the entirety of layers 102. In some examples, a continuous fiber fabric may include a woven fabric having any suitable weave pattern. In some examples, layers 102 may include alternating layers of a continuous fiber fabric and a nonwoven fabric.

In some examples, interlayers 103 may introduce a plurality of third fibers 108 ("radial fibers 108") extending substantially in the radial direction "R" into composite fiber preform 100. Radial fibers 108 may mechanically bind layers 102 together. For example, radial fibers 108 may secure at least one layer of layers 102 to one or more adjacent layers of layers 102. In this way, radial fibers 108 may increase an interlaminar shear strength of composite fiber preform 100 and/or brake disc 38 formed from composite fiber preform 100. Additionally or alternatively, the interlayer and resulting radial fibers 108 may partially compress layers 102, e.g., via tensioning the interlayers 103 during winding, to form a more compacted composite fiber preform 100 compared to a preform including a similar number of layers 102 that have not been compressed. The compaction may increase the fiber volume fraction carbon fibers of preform 100.

While some of the figures described herein show a relatively small number of layers to form the respective fiber preforms, the preforms (e.g., composite fiber preform 100) produced as a result of the techniques describe herein may include any suitable number of layers 102 and interlayers 103 to produce the desired outer diameter OD of the resultant preform. For example, each layer 102 and/or interlayer 103 may have a thickness as measured in the radial direction of about 1 millimeter (mm) to about 2 mm. In some examples, each layer 102 and/or interlayer 103 may have a different thickness than about 1 to about 2 mm, and/or may have thicknesses that are different from each other. Composite fiber preform 100, once completed, may be in the shape of an annulus defining an outer preform diameter (OD) and inner preform diameter (ID). In some examples, the outer preform diameter (OD) of composite fiber preform 100 may be about 14.5 inches (e.g., about 37 cm) to about 25 inches (e.g., about 64 cm) and the inner preform diameter (ID) of composite fiber preform 100 may be about 4.5 inches (e.g., about 12 cm) to about 15 inches (e.g., about 38 cm). Hence, in some examples, fiber preform may include between about 30 layers and about 520 layers. In other examples, fiber preform may include less than 30 layers or more than 520 layers.

In some examples, after forming preform 100, e.g., before or after any one of pyrolysis (or other carbonization), or densification of preform 100, preform 100 may be sectioned (e.g., cut) along the circumferential/radial plane (e.g., parallel to the xy-plane) to form a brake disc (e.g., brake disc 38). In some examples, a total thickness (T) of each sectioned portion of composite fiber preform 100 may be about 1 inch to about 3 inches (e.g., about 2.54 cm to about 7.62 cm).

In some examples, composite fiber preform 100 may be constructed with lug notches 72 (not shown in FIG. 3A) formed into either the outer diameter (OD) or inner diameter (ID) depending on whether composite fiber preform 100 is intended to be formed as a rotor brake disc 36 or stator brake disc 38 respectively. In some examples, a region of preform 100 at lug notches 72, for example, with about 3 inches (e.g., about 7.62 cm) of lug notches 72 may include more radial fibers 108 compared to other regions of fiber preform 100. A greater concentration of radial fibers 108 near lug notches 72 may improve torque transfer strength at lug notches 72. In some examples, lug notches may be formed together with fiber preform 100, may be cut into composite fiber preform 100 after the respective layers 102 have all been wound, or may be introduced after composite fiber preform 100 has undergone some or all of the subsequent carbonization (e.g., pyrolyzation) and densification procedures to convert composite fiber preform 100 into a C—C composite.

In some examples, the fiber preform may be in the shape of an annulus (e.g., disc-shaped) that defines both an inner diameter ID and an outer diameter OD. A cross section of the fiber preform annulus may be divided into an inner radial section, a central radial section, and an outer radial section. For example, layers 102A and 102B may define the inner radial section, layers 102C-102E may define the central radial section, and layers 102G and 102F may define the outer radial section. In other examples, the inner radial section, the central radial section, and the outer radial section may include any suitable number of layers. In other examples, the inner radial section, the central radial section, and the outer radial section may each include between about 5% to about 90% of a total width W of the annulus.

In some examples, each of the inner radial section and outer radial section may include a greater percentage of radial extending fibers (relative to axial or circumferential extending fibers), compared to a percentage of radial extending fibers in the central radial section. In some examples, a percentage of radial extending fibers may be selected based on the location of a lug region within the final fiber preform (e.g., region configured to receive lug notches that interlock with the splines or beam keys of a wheel and brake assembly).

Axial fibers 104, circumferential fibers 106, and radial fibers 108 may include carbon fibers, fibers configured to subsequently carbonize (e.g., pyrolyze) into carbon fibers (hereinafter "carbon-precursor fibers"), or combinations thereof. Carbon-precursor fibers may include, for example, polyacrylonitrile (PAN) fibers, oxidized polyacrylonitrile (O-PAN) fibers, rayon fibers, pitch fibers, or the like.

In some examples, axial fibers 104 and/or circumferential fibers 106, may be in the form of tows (e.g., bundles of individual fibers linearly aligned) of continuous filaments. Each tow may include hundreds to several thousand of individual fibers unidirectionally aligned to form a single tow. In such examples, layers 102 may include a fabric having a plurality of unidirectionally aligned tows within the segment with each tow including a plurality of fibers.

In some examples, layers 102 may be in the form of a fabric. For example, layers 102 may be in the form of a woven fabric, a knitted fabric, a unidirectional stitched fabric, or the like.

In some examples, layers 102 may be in the form of a felt, e.g., a carbon felt. The carbon felt may be selected to consolidate during winding, e.g., by controlling tension. Additionally, the carbon felt may comprise carbon fibers that may be more evenly dispersed than a fiber tow, which may improve infiltration/densification of the preform in subsequent processing steps. In some examples, the felt (e.g., layers 102) may be a non-woven carbon felt and may comprise carded, cross-lapped, and needled O-PAN staple fibers that may initially be relatively short before carding, cross-lapping, and needling. The felt may also be heat treated, which may convert at least a portion of the O-PAN fibers to carbon. In some examples, layers 102 may include a duplex fabric that includes a plurality of unidirectionally aligned axial fibers 104 and/or circumferential fibers 106 (e.g., aligned tows) that have been combined with a plurality of web fibers (not shown). The web fibers may include chopped, discontinuous, or staple fibers having an unspecified alignment that are relatively short in comparison to axial fibers 104 and/or circumferential fibers 106 that, when combined with axial fibers 104 and/or circumferential fibers 106 in a duplex fabric, become intertwined with aligned axial fibers 104 and/or circumferential fibers 106 to impart integrity to each layer of layers 102. The web fibers may define a random fiber orientation relative to each other and to aligned axial fibers 104 and/or circumferential fibers 106.

In some examples, the formation of a duplex fabric may be accomplished by combining one or more layers of aligned tow fibers (e.g., axial fibers 104 and/or circumferential fibers 106) with one or more layers of web fibers that are subsequently needle-punched into the layer of tow fibers to form duplex fabric. For example, a layer of web fibers may be formed by cross-lapping a carded web to achieve a desired areal weight and then needle-punching the layer to form the web layer. Additionally, or alternatively, the web layer may be formed by air-laying the web fibers on top of a layer of the unidirectionally aligned fibers. The layer of unidirectionally aligned fibers may be formed by spreading large continuous tows using a creel, to form a sheet of the desired areal weight with fibers being aligned in the same direction. Both the web layer and the layer of unidirectionally aligned fibers may be needle-punched together to force the relatively short web fibers to become intertwined with unidirectionally aligned fibers to form the duplex fabric (e.g., layers 102).

Additionally, or alternatively layers 102 may be formed as a duplex fabric by initially incorporating web fibers within tows of unidirectionally aligned fibers. A layer of the described tows may be formed by spreading large the tows using a creel, to form a sheet of the desired areal weight. The layer may then be needle-punched to force the relatively short web fibers to become intertwined with unidirectionally aligned fibers thereby forming the duplex fabric.

As a result of needling process in either of the above examples, the web fibers become intertwined with the aligned fibers and help bind aligned fibers together allowing layers 102 to be efficiently handled without having aligned fibers separate or fall apart with subsequent processing. The resultant duplex fabric (e.g., layers 102) may be more durable, retain its shape better, and be overall easier to further manufacture compared to a layer of only unidirectionally aligned fibers. Other techniques may also be used to form layers 102 as a duplex fabric that includes both unidirectionally aligned fibers and web fibers which may be known to those skilled in the art. In all the examples described herein, layers 102 and the fabric segments used to from the fiber preforms described herein may be composed of one or more layers of a duplex fabric.

As a result of winding process in either of the above examples, the radial fibers 108 become intertwined with the aligned axial fibers 104 and/or circumferential fibers 106 and help bind aligned fibers together allowing combined layers 102 and interlayers 103 to be efficiently handled without having aligned fibers separate or fall apart with subsequent processing. The resultant carbon fiber preform 100 may be more durable, retain its shape better, and be overall easier to further manufacture compared to layers of carbon fiber fabric, carbon felt, duplex fabric, or the like, including only in-plane fibers.

Both the radial fibers 108 and in-plane fibers 104, 106 may be formed of the same carbon fiber or carbon fiber precursor materials, may be formed of different carbon fiber or carbon fiber precursor materials, or may be formed of different combinations of carbon fiber and/or carbon fiber precursor materials. In some examples, layers 102 may be formed to have an areal weight of about 500 grams per square meter (g/m$^2$) to about 2500 g/m$^2$ such as, about 597 g/m$^2$ to about 1346 g/m$^2$.

In some examples, composite fiber preform 100 may optionally be wrapped with a compaction layer 312 around the outer diameter of composite fiber preform 100 and may include a core 310, as illustrated in FIG. 3C. Compaction layer 312 may be configured to maintain a compaction of the composite fiber preform 100, and may comprise a filament wound carbon tow. In some examples, each of layers 102 and 103 may provide compaction, and may be referred to as a compaction layer. For example, the compaction force of each layer 102 and/or 103 may be caused, and proportional to, tension on the layer as it is wound about core 310 or a mandrel. In some examples, the fiber volume of each layer may also be affected, and/or controlled, by the tension on layers 102 and/or 103 as they are wound. For example, tension may need to decrease as a function of radius of composite fiber preform 100 to maintain a constant fiber volume. Conversely, a constant tension on layers 102 and/or 103 as a function of radius of composite fiber preform 100 may result in a fiber volume gradient as a function of radius of composite fiber preform 100, e.g., from the inner diameter to the outer diameter of composite fiber preform 100. In other words, the fiber volume of composite fiber preform 100 as a function of radius of composite fiber preform 100 may be controlled by controlling the tension of layers 102 and/or 103 as they are wound.

In some examples, core 310 may support the inner diameter of composite fiber preform 100 and may comprise a filament wound carbon tow. In some examples, core 310 may be removable from composite fiber preform 312, or may be integral to, included with, and/or a part of carbon fiber preform 100. In some examples, core 312 may be configured to couple to a mandrel, e.g., so as to wind carbon fiber preform 100. In some examples, composite fiber preform 100 may be thermally cycled to rigidize at least one of core 310, the composite fiber preform 100, or compaction layer 312.

Figure 4A:
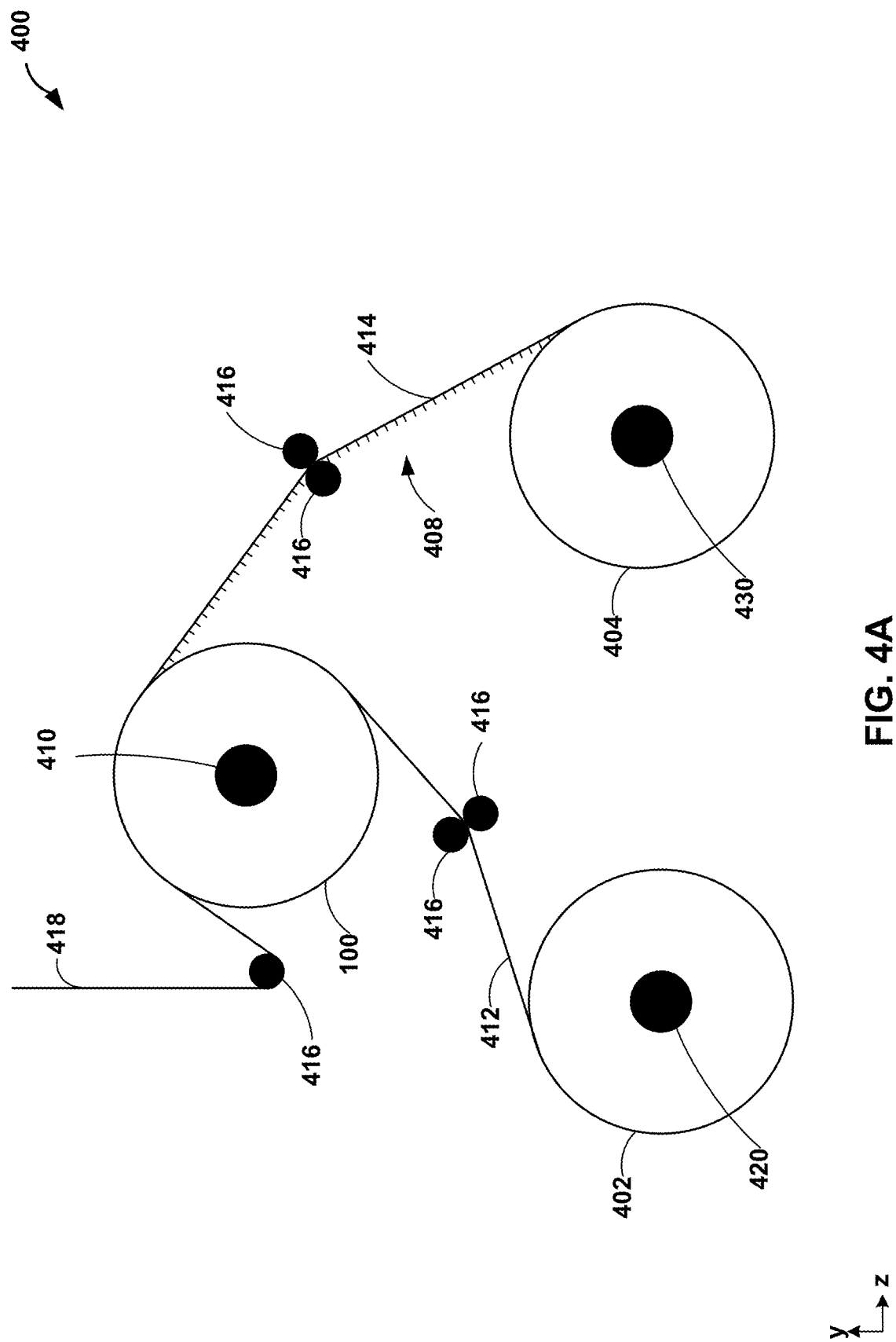
FIG. 4A is a conceptual diagram illustrating an example system for manufacturing the composite fiber preform of FIG. 3A.

FIG. 4A is a conceptual diagram illustrating an example system 400 for manufacturing composite fiber preform 100. System 400 includes a fabric source 402 and interlayer source 404. In the example shown, fabric source 402 includes a length of carbon fiber fabric 412 wound into a roll, and interlayer source 404 includes a length of interlayer 414 wound into a roll. System 400 is configured to wind and/or combine carbon fiber fabric 412 and interlayer 414 into composite fiber preform 100.

Fiber preform is configured to wind carbon fabric 414 and interlayer 412 into composite fiber preform 100. Composite fiber preform 100 may be wound about a core 410 which may extend along central longitudinal axis in the axial direction. In some examples, composite fiber preform 100 may be coupled to a motor (not shown). The motor may be configured to controllably core 410 to wind carbon fiber fabric 412 from fabric source 402 and interlayer 414 from interlayer source 404 around core 410 to form composite fiber preform 100. In some example, the motor may include a variable speed motor communicatively coupled to a controller (not shown). The controller may be configured to control a speed of rotation of core 410.

In some examples, core 410 may include a material that can be heated to between about 1900° C. and about 2500° C. For example, core 410 may include a graphite mandrel. In some examples, core 410 may include a graphite ring removably attached to a metal rod. In some examples, core 410 may be removable from composite fiber preform 100, e.g., after fiber preform is wound and/or after one or more subsequent densification and/or consolidation processing steps.

Fabric source 402 may be a roll of carbon fiber fabric 412 that is wound around a core 420. Fabric source 402 may be a roll of carbon fiber fabric 412 comprising a material including in-plane carbon fibers, e.g., an in-plane carbon fiber fabric, a roll of fiber tow fabric, a carbon felt and/or a carbon-based felt, and the like. Carbon fiber fabric 412 may be an example of layers 102 described above. Core 420 may be coupled to a tensioner (not shown), for example, a tension bar, one or more nip rollers, an electric motor or a braking system configured to provide a selected tension on carbon fiber fabric 412 as core 410 is rotated to wind carbon fiber fabric 412 from fabric source 402 onto composite fiber preform 100. System 400 may additionally or alternatively include one or more tensioning rollers 416 (e.g., nip rollers, idlers, adjustable and/or translatable idlers, web steering rollers and the like) configured to provide a selected tension on the carbon fiber fabric 412 as core 410 is rotated to wind carbon fiber fabric 412 onto composite fiber preform 100. In some examples, the selected tension may affect the density of a fiber preform 100, e.g., an in-plane fiber volume and/or density (e.g., axial fibers 104 and/or circumferential fibers 106) relative to a total volume and/or density of composite fiber preform 100. For example, a greater tension during winding may result in a denser fiber preform 100 compared to a lesser tension. In some examples, a tension may be selected to result in a selected in-plane fiber volume and/or density relative to a total volume and/or density of composite fiber preform 100. For example, a tension may be selected to result in a percent in-plane fiber volume relative to a total volume of composite fiber preform 100 between about 15% to about 50%, such as about 22% to about 25%.

Interlayer source 404 may be a length of interlayer 414 that is wound around a core 430. Interlayer 414 may include a plurality of radial fibers 408 deposited on a carrier 418 that is wound around a core 430 to form interlayer source 404. Interlayer 414 may be an example of interlayers 103 and radial fibers 408 may be substantially similar to radial fibers 108 described above. Interlayer 414 may include radial fibers 408 that include a plurality of out-of-plane and/or "radially" oriented carbon fibers, e.g., oriented parallel with the "thickness," or shortest dimension, of interlayer 414. In some examples, interlayer 414 may be a highly oriented milled carbon fiber ply disposed on a carrier 418, e.g., a removable backing, a peel ply, or any other suitable carrier material. For example, interlayer 414 may comprise radial fiber 408 that are highly oriented, e.g., having their long dimension along a direction that is substantially perpendicular to a surface of the carrier material. In some examples, substantially all (approximately 100%) of radial fibers 408 have their long dimension substantially perpendicular to the surface of the carrier material, e.g., as illustrated in FIG. 5C below. In some examples, substantially all (approximately 100%) of radial fibers 408 have their long dimension oriented greater than or equal to 45 degrees from the surface of the carrier material (e.g., radial fibers 408 are substantially all oriented within (or equal to) +/−45 degrees from the surface normal of the carrier material, as illustrated in FIG. 5B below). In some examples, the radial thickness of interlayer 414 may be defined by the average length of radial fibers 408. In some examples, the average length of radial fiber 408 is about 150 microns. In some examples, interlayer 414 may include radial fibers 408 that may have different properties or may have been processed differently than, for example, the in-plane carbon fibers of carbon fiber fabric 412. For example, carbon fiber fabric 412 may be heat treated without stretch control, whereas the highly oriented milled carbon fiber ply may be heat treated with stretch control.

Core 430 may be coupled to a tensioner (not shown), for example, an electric motor or a braking system configured to provide a selected tension on radial fiber source 404 as core 410 is rotated to wind radial fibers 408 onto composite fiber preform 100. System 400 may additionally or alternatively include one or more tensioning rollers 416 (e.g., nip rollers, idlers, adjustable and/or translatable idlers, web steering rollers and the like) configured to provide a selected tension on radial fibers 408 (or a web material or removable backing material onto which radial fibers 408 are disposed) as core 410 is rotated to wind radial fibers 408 onto composite fiber preform 100. In some examples, the selected tension may affect a density of fiber preform 100, e.g., a fiber volume and/or density relative to a total volume and/or density of composite fiber preform 100. For example, a greater tension during winding may result in a denser fiber preform 100 and an increased amount/length of radial fibers 408 extending into the adjacent carbon fiber fabric 412 layers of preform 100 compared to a lesser tension. In some examples, a tension may be selected to result in a selected radial fibers 408 volume and/or density relative to a total volume and/or density of composite fiber preform 100.

In some examples, combination of carbon fiber fabric 412 and interlayer 414 by winding onto preform 100 may introduce a plurality of radial fibers 408 extending in the radial direction of preform 100 and extending into one or more layers of carbon fiber fabric 412, e.g., extending into adjacent in-plane fiber fabric layers 412. In some examples, the tension of one or both of carbon fiber fabric 412 and interlayer 414 may be controlled to provide a selected amount of radial fibers 408 in selected regions of composite fiber preform 100. For example, during winding of the inner radial section of preform 100, a first tension of carbon fiber fabric 412 and a first tension of interlayer 414 may provide a greater amount of radial fibers 408, or a greater amount of the length of radial fibers 408 extending within one or more carbon fiber fabric 412 layer, relative to a central radial section (e.g., central with respect to width W of FIG. 3A) wound with a second tension of carbon fiber fabric 412 and/or a second tension of interlayer 414 (e.g., each of the tensions may be varied independently or in any combination to increase or decrease the amount of radial fibers 408 and/or the amount of length that radial fibers 408 extend within adjacent layers). Similarly, during winding of the outer radial section of preform 100, a third tension of carbon fiber fabric 412 and/or a third tension of interlayer 414 may provide a greater amount of radial fibers 408, or a greater amount of the length of radial fibers 408 extending within one or more adjacent layers. In this way, composite fiber preform 100 may be formed to have a selected amount (e.g., percentage) of radially extending fibers 408 relative to axial fibers 104 and/or circumferential fibers 106, or a selected amount of the length of radial fibers 408 extending within one or more carbon fiber fabric 412 layers.

Figure 4B:
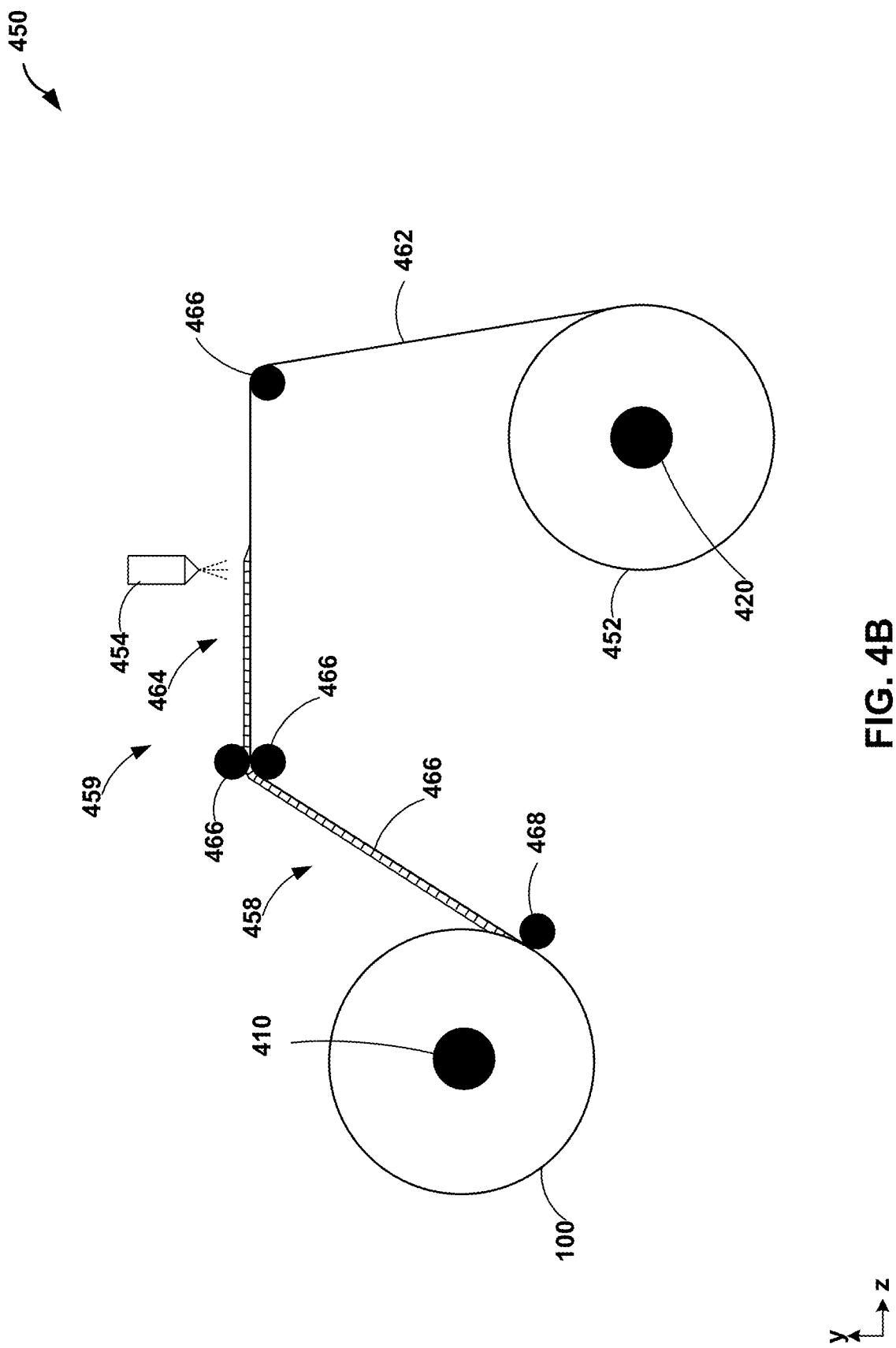
FIG. 4B is a conceptual diagram illustrating another example system for manufacturing the composite fiber preform of FIG. 3A.

FIG. 4B is a conceptual diagram illustrating an example system 450 for manufacturing composite fiber preform 100. System 450 includes a fabric source 452 and a coater 454. System 450 is configured to form interlayer 464 on carbon fiber fabric 462 to form composite fiber fabric 470 and wind the composite fiber fabric 470 to form composite fiber preform 100.

Composite fiber preform 100 may be wound about a core 410 which may extend along central longitudinal axis in the axial direction. In some examples, composite fiber preform 100 may be coupled to a motor (not shown). The motor may be configured to controllably wind fabric from fabric source 452 around core 410 to form composite fiber preform 100. In some example, the motor may include a variable speed motor communicatively coupled to a controller (not shown). The controller may be configured to control a speed of rotation of core 410.

In some examples, core 410 may include a material that can be heated to between about 1900° C. and about 2500° C., as described above. For example, core 410 may include a graphite mandrel. In some examples, core 410 may include a graphite ring removably attached to a metal rod.

In some examples, fabric source 452 may be a roll of carbon fiber fabric 462 that is wound around a core 420. Carbon fiber fabric 462 may comprise a material including in-plane carbon fibers, e.g., a roll of fiber tow fabric, a carbon felt, a carbon knit fabric, a polyacrylonitrile (PAN)

fiber, an oxidized PAN fiber such as PANOX®, and the like. Carbon fiber fabric 462 may be an example of layers 102 described above. Core 420 may be coupled to a tensioner (not shown), for example, a tension bar, one or more nip rollers, an electric motor or a braking system configured to provide a selected tension on source fabric 452 as core 410 is rotated to wind fabric from fabric source 452 onto composite fiber preform 100. System 450 may additionally or alternatively include one or more tensioning rollers 466 (e.g., nip rollers, idlers, adjustable and/or translatable idlers, web steering rollers and the like) configured to provide a selected tension on the carbon fiber fabric 462 as core 410 is rotated to wind carbon fiber fabric 462 onto composite fiber preform 100. In some examples, the selected tension may affect a density of fiber preform 100, e.g., a fiber volume relative to a total volume of composite fiber preform 100. For example, a greater tension during winding may result in a denser fiber preform 100 compared to a lesser tension. In some examples, a tension may be selected to result in a selected fiber volume relative to a total volume of composite fiber preform 100. For example, a tension may be selected to result in a percent fiber volume relative to a total volume of composite fiber preform 100 between about 1% to about 50%, such as about 15% to about 25%.

Coater 454 may be configured to coat or otherwise deposit a material that forms interlayer 464 on a surface of carbon fiber fabric 412. Interlayer 464 may comprise a binder 459, and optionally a plurality of nanoparticles 458 mixed within binder 459. In some examples, coater 454 may be a hopper configured to deposit the binder 459 onto a surface of carbon fiber fabric 462. For example, the binder 459 may be a dry powder of binder material, and a hopper may be configured to deposit the dry binder onto carbon fiber fabric 462. In some example, binder 459 may include nanoparticles 458, e.g., pre-mixed with binder 459. In other examples, the hopper may be configured to receive and mix nanoparticles 458 with binder 459 and deposit the binder 459 with nanoparticles 458 onto the carbon fiber fabric 462. In still other examples, coater 454 may comprise more than one hopper, and a first hopper may be configured to deposit binder 459 or nanoparticles 458 onto the carbon fiber fabric 462, and a second downstream, e.g., in the direction of movement of carbon fiber fabric 462 during winding, hopper may be configured to deposit the other of nanoparticles 458 or binder 459 onto the carbon fiber fabric to mix and form interlayer 464. In some examples, coater 454 may be configured to deposit a binder solution onto a surface of carbon fiber fabric 462. For example, the binder 459 may be mixed with a solvent, such as an organic solvent, methyl ethyl ketone (MEK), acetone or any suitable solvent, to form a binder solution, and a coater 454 may be configured to coat and/or spray a surface of carbon fiber fabric 462 with the binder solution. The binder solution may be further mixed with nanoparticles 458 prior to coating onto the carbon fiber fabric 462. In some examples, whether deposited as a dry binder or coated as a binder solution, binder 459 may comprise a weight percent (wt %) of the dry carbon fiber fabric 462 between about 10 wt % to about 30 wt %. In some examples, when added to the dry binder or the binder solution, nanoparticles 458 may comprise a weight percent (wt %) of the binder 459 between about 2 wt % to about 10 wt %.

Binder 459 may comprise a resin, a thermoset resin, a phenolic resin, an adhesive or the like. Binder 459 may have a curing temperature range of about 100 degrees Celsius to about 280 degrees Celsius and a high carbon yield during carbonization. In some examples, binder 459 may be an phenolic resin, for example, Durite and Bakelite or Borden resin from Hexion Inc. of Columbus, OH.

In some examples, whether deposited as a dry binder or coated as a binder solution, and whether containing nanoparticles 458 or not, binder 459 and carbon fiber fabric 462 may be compressed prior to winding to form composite fiber preform 100. For example, nip rollers 466 may be configured to compress binder 459 and carbon fiber fabric 462, and/or press roller 468 may be configured to compress binder 459 and carbon fiber fabric 462. The binder solution may be dried, e.g., before or after winding, and binder 459, whether in dry form or as a solution and whether containing nanoparticles 458 or not, may be cured after winding. For example, composite fiber preform 100 may be heated to cure binder 459.

In some examples, binder 459, whether containing nanoparticles 458 or not, may be configured to bind and/or adhere adjacent and/or successive carbon fiber fabric layers, e.g., of carbon fiber fabric 462. In some examples, binder 459 may be configured to improve a property of composite fiber preform 100, e.g., to improve shear strength, tensile strength, and/or any other suitable mechanical property of carbon fiber preform 100, successive layers of carbon fiber preform 100, and/or brake discs formed from carbon fiber preform 100. Binder 459 may have any suitable thickness. In some examples, binder 459 may have a thickness ranging from about 0.05 millimeters (mm) to about 0.6 mm.

Nanoparticles 458 may be single-walled or multi-walled carbon nanotubes, carbon nanofibers, a graphene nanoplatelet carbon nanofibers such as XGnP® from XG Sciences of Lansing, MI The binder 459 may be any suitable material configured to disperse nanoparticles 458 within binder 459 on the surface of carbon fiber fabric 462 and/or to orient carbon fibers of nanoparticles 458 substantially in the axial direction (e.g., to be axial fibers 104). In some examples, coater 454 and/or a web speed of carbon fiber fabric 462 may be selected to affect a coating thickness of binder 459 and/or a density of nanoparticles 458 over a surface area of carbon fiber fabric 462. For example, a slower web speed and/or an increased coating rate (e.g., volume per time) from coater 454 may result in a greater volume and/or density of nanoparticles 458. In some examples, a web speed and/or coating rate may be selected to result in a selected nanoparticles 458 and/or binder 459 volume and/or density relative to a total volume and/or density of composite fiber preform 100. For example, a web speed and/or coating rate may be selected to result in a percent binder 459 volume relative to a total volume of composite fiber preform 100 between about 10% to about 30%. In some examples, nanoparticles 458 within binder 459 may improve carbon disc and/or brake friction performance.

In some examples, combination of carbon fiber fabric 462 and binder 459 by coating/depositing and winding onto preform 100 may provide interlamination strength (e.g., increased peel force) between successive layers of carbon fiber fabric 462 of brake discs 36, 38 in a format in which the orientation of the carbon fibers of carbon fiber fabric 462 may be substantially in the axial direction, e.g., axial fibers 104 oriented in the thickness direction or "z-direction" of brake discs 36, 38 after sectioning of composite fiber preform 100. Axial fibers 104 in the "z-direction" may have reduced carbon fiber pull-out and an improved wear rate relative to circumferential fibers 106 and radial fibers 108, and the interlayer adhesion provided by binder 459 may decrease delamination of layers 102 of brake discs 36, 38.

In some examples, the tension of carbon fiber fabric 462, web speed, and/or an coating rate of coater 454 may be controlled to provide a selected amount of binder 459 and/or nanoparticles 458 in selected regions of composite fiber preform 100. For example, during winding of the inner radial section of preform 100, a first tension of carbon fiber fabric 462, a first web speed, and a first coating rate may provide a greater amount of binder 459 and/or nanoparticles 458 relative to a central radial section (e.g., central with respect to width W of FIG. 3A) wound with a second tension of carbon fiber fabric 462, and/or second web speed, and/or second coating rate (e.g., each of which may be varied independently or in any combination to increase or decrease the amount of binder 459 and/or nanoparticles 458). Similarly, during winding of the outer radial section of preform 100, a third tension of carbon fiber fabric 462, and/or a third web speed, and/or a third coating rate may provide a greater amount of binder 459 and/or nanoparticles 458 relative to a central radial section. In this way, composite fiber preform 100 may be formed to have a selected amount (e.g., percentage) of binder 459 and/or nanoparticles 458 as a function of radius of composite fiber preform 100 and brake discs 36, 38.

With reference to both FIGS. 4A and 4B, the in-plane fibers of carbon fiber fabric 412, 462 wound to form composite preform 100 are in the axial-circumferential plane of brake discs 36, 38 once the discs are sectioned from composite fiber preform 100, e.g., effectively re-orienting the carbon fibers of the carbon fiber fabric 412, 462 layers 102 as compared with sheet stacking methods. For example and by way of contrast, sheet stacking methods may stack flat sheets of carbon fiber fabric 412, 462 as layers 102 which may then be converted (e.g., vie die cutting or any other method) to form annular brake discs 36, 38 in which the in-plane carbon fibers of each layer of carbon fiber fabric 412, 462 are ultimately oriented in the radial-circumferential plane of brake discs 36, 38 (e.g., also referred to as the radial-tangential plane). In other words, the carbon fiber fabric 412, 462 layer stack 102 of brake discs 36, 38 according to the techniques disclosed herein is in the form of concentric annuli having the same axial length, in contrast to sheet stacking methods resulting in an axial layer stack 102 of carbon fiber fabric 412, 462 discs having the same radius. As a result, brake discs 36, 38 formed according to the techniques disclosed herein may have an increased axial fiber 104 content, an improved wear rate and improved thermal performance, with interlaminar adhesion and shear resistance being provided at least in part by interlayer 414 and radial fibers 408 in the technique of FIG. 4A and FIG. 7, and interlayer 464 and binder 459 in the technique of FIG. 4B and FIG. 8. In some examples, composite preform 100 may comprise brake discs 36, 38, e.g., without sectioning. In other words, composite preform 100 may be formed as brake discs 36, 38, e.g., with the axial length/thickness desired for forming brake discs 36, 38 as opposed to a preform with a longer axial length configured to be sectioned to form brake discs 36, 38 with the desired axial length/thickness.

FIGS. 5A-5C are cross-sectional views of example interlayers 414 with different densities of highly oriented milled carbon fibers, e.g., radial fibers 408. In the example shown, interlayer 414 includes radial fibers 408. In the examples shown, interlayer 414, e.g., radial fibers 408, are disposed on carrier 418 before winding to form composite fiber preform 100 and removal of carrier 418.

In some examples, the orientation, or orientation distribution, of radial fibers 408 may be proportional to the density of radial fibers 408. For example, FIGS. 5A-5C illustrate three different densities of radial fibers 408 comprising interlayer 414, with FIG. 5A illustrating a low radial fibers 408 density, FIG. 5B illustrating a medium radial fibers 408 density, and FIG. 5C illustrating a high radial fibers 408 density. FIG. 5B illustrates substantially all (approximately 100%) of radial fibers 408 having their long dimension oriented greater than or equal to 45 degrees from the surface of the carrier 418 (e.g., radial fibers 408 are substantially all oriented within (or equal to) +/−45 degrees from the surface normal of the carrier 418). FIG. 5C illustrates substantially all (approximately 100%) of radial fibers 408 having their long dimension substantially perpendicular to the surface of the carrier 418.

Figure 6A:
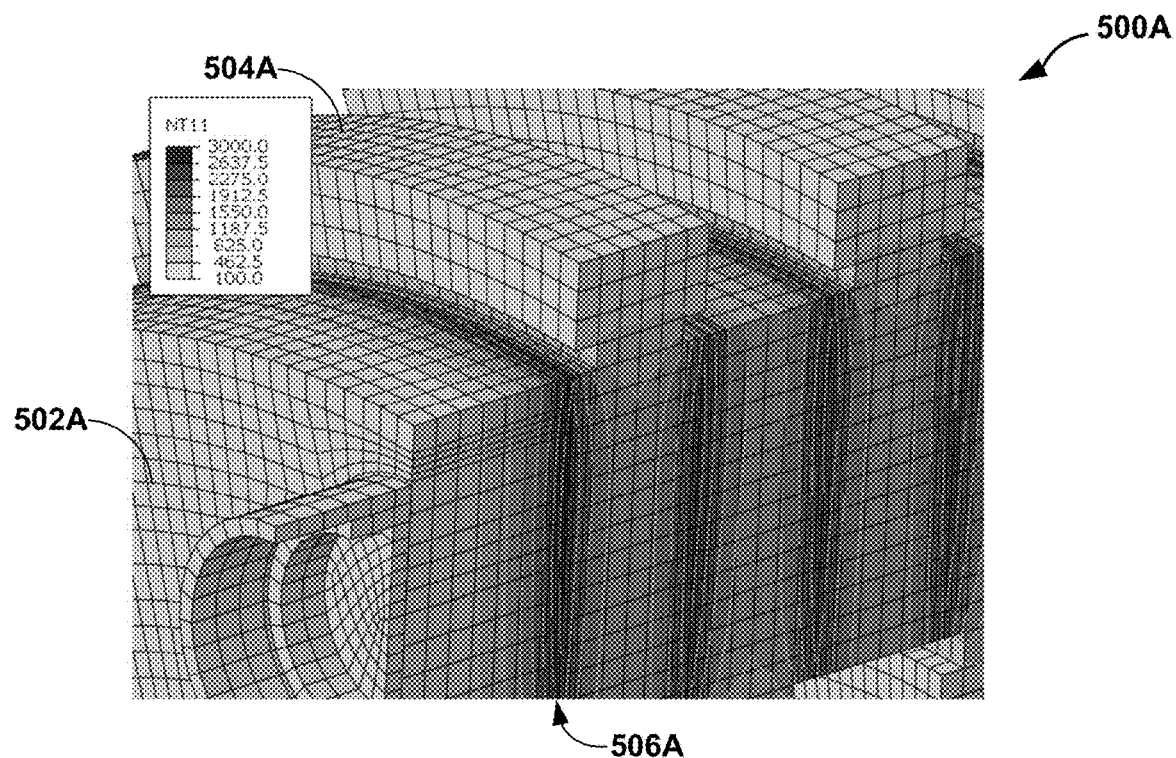
FIGS. 6A and 6B are heat maps illustrating example peak temperature during braking procedures of an example friction composite material manufactured using the techniques described herein and an example non-woven friction composite material.
Figure 6B:
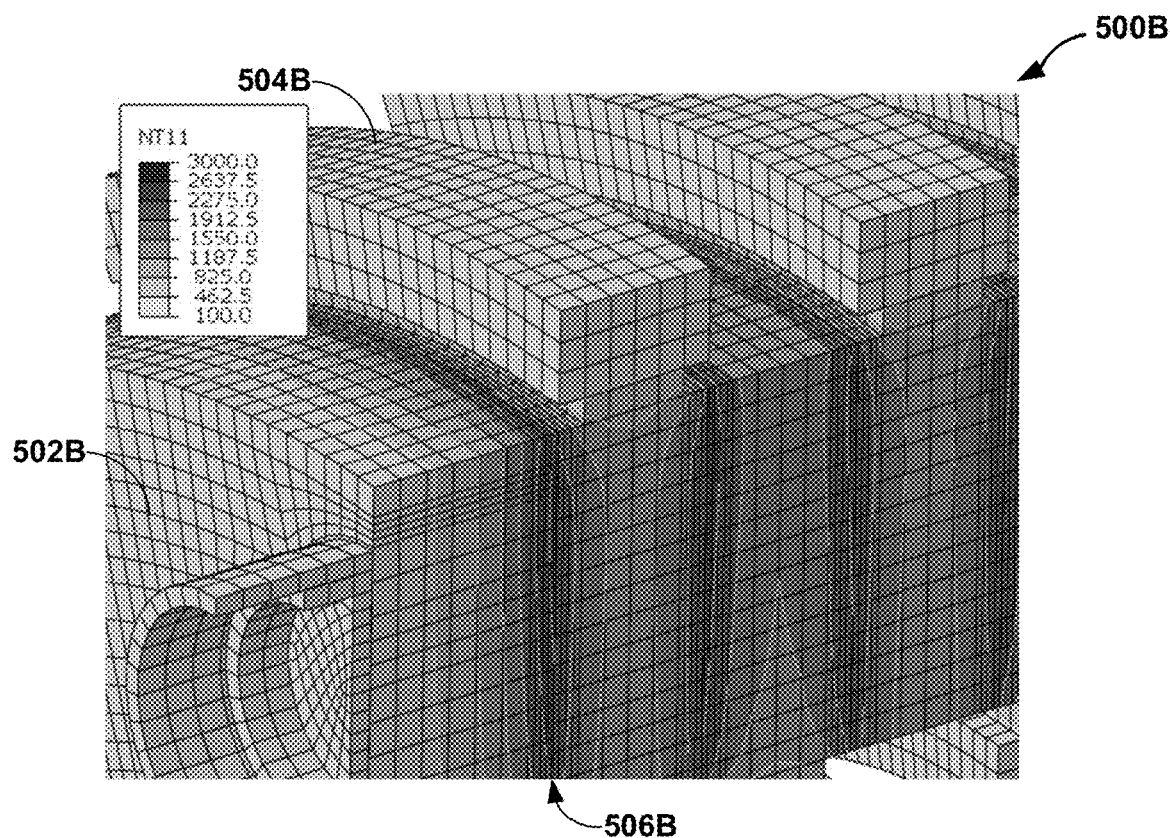

FIGS. 6A and 6B are heat maps 500A and 500B of an example rotor brake disc and adjacent stator brake disc interface. As illustrated in FIG. 6A, stator brake disc 502A and adjacent rotor brake disc 504A may define friction surface interface 506A. Stator brake disc 502A and rotor brake disc 504A include a non-woven friction composite. During braking procedure, friction between stator brake disc 502A and rotor brake disc 504A at friction surface interface 506A generates heat. As indicated in heat map 500A, the temperature of friction surface interface 506A is about 2800° F. In some examples, such temperatures may increase wear of stator brake disc 502A and rotor brake disc 504A, damage protective coatings on stator brake disc 502A and rotor brake disc 504A, and/or reduce the useable life of stator brake disc 502A and rotor brake disc 504A.

As illustrated in FIG. 6B, stator brake disc 502B and adjacent rotor brake disc 504B may define friction surface interface 506B. Stator brake disc 502B and rotor brake disc 504B material 502B include a friction composite material manufactured using the techniques described herein. As indicated in heat map 500B, during braking procedures, the temperature of friction surface interface 506B is less 2800° F., such as less than about 2400° F. This reduction in temperature (e.g., relative to the example of FIG. 6A) may reduce wear of stator brake disc 502B and rotor brake disc 504B and/or improve the useable life of protective coatings such as antioxidant coatings on stator brake disc 502B and rotor brake disc 504B. In this way, brake discs including friction composite materials manufactured using the techniques described herein may increase the useable life of the brake discs.

Figure 7:
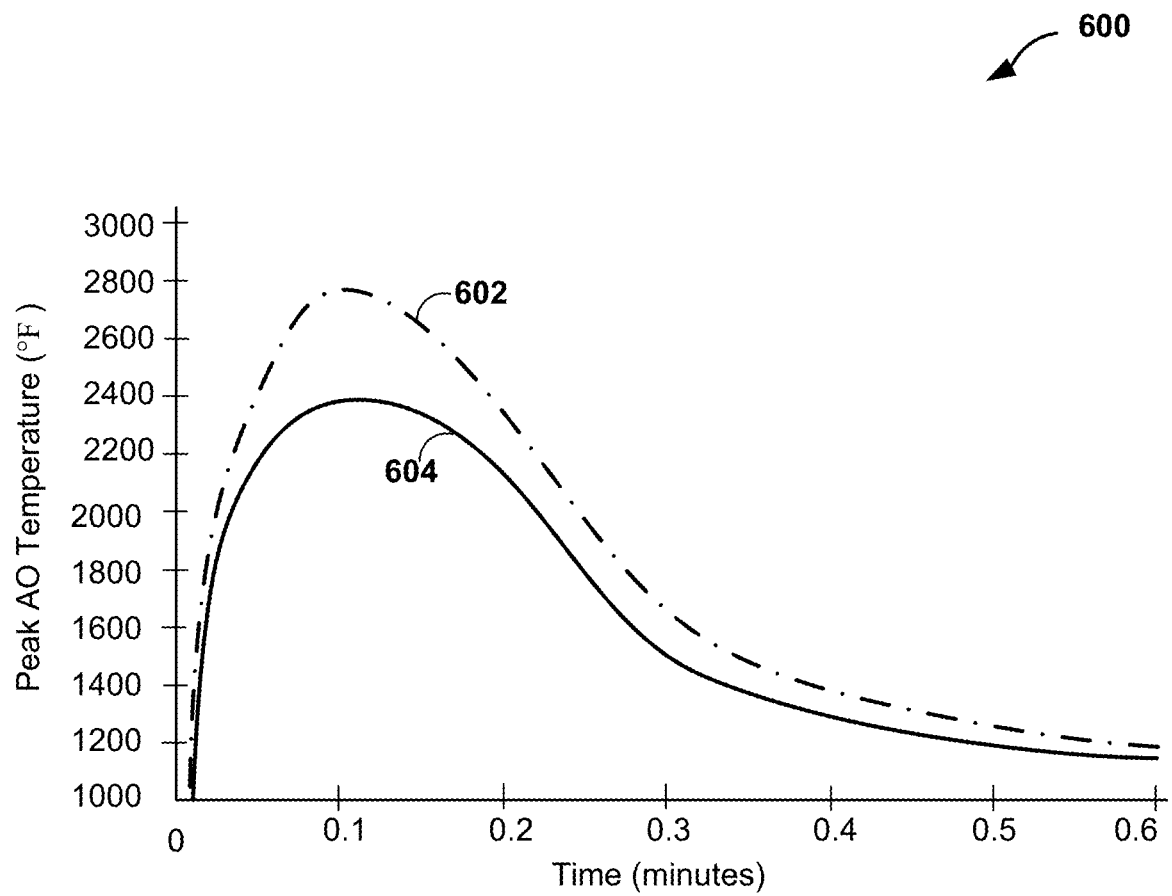
FIG. 7 is a graph of peak antioxidant temperature versus time for an example friction composite material manufactured using the techniques described herein and an example non-woven friction composite material.

FIG. 7 is a graph 600 of peak antioxidant (AO) temperature versus time for an example friction composite material manufactured using the techniques described herein and an example non-woven friction composite material. Line 602 illustrates the temperature of the example non-woven friction composite material. As illustrated in FIG. 7, the peak temperature reaches about 2800° F. during braking procedures. After reaching the peak temperature of about 2800° F., the brake cools over time. Line 604 illustrates the temperature of the example friction composite material manufactured using the techniques described herein.

The friction composite material provides a lower thermal gradient due to the axial fibers compared to the non-woven friction composite material. For example, as illustrated in FIG. 7, the peak temperature of the described friction composite material reaches less than about 2400° F. during braking procedures. In some examples, the peak temperature of the described friction composite materials may be about 550° F. less than a peak temperature of the non-woven friction composite material. In some examples, an antioxidant surface peak temperature of the described friction composite materials may be about 350° F. less than a peak temperature of the non-woven friction composite material.

Additionally, the described friction composite materials spend less time above 2000° F. compared to the non-woven friction composite material.

Figure 8:
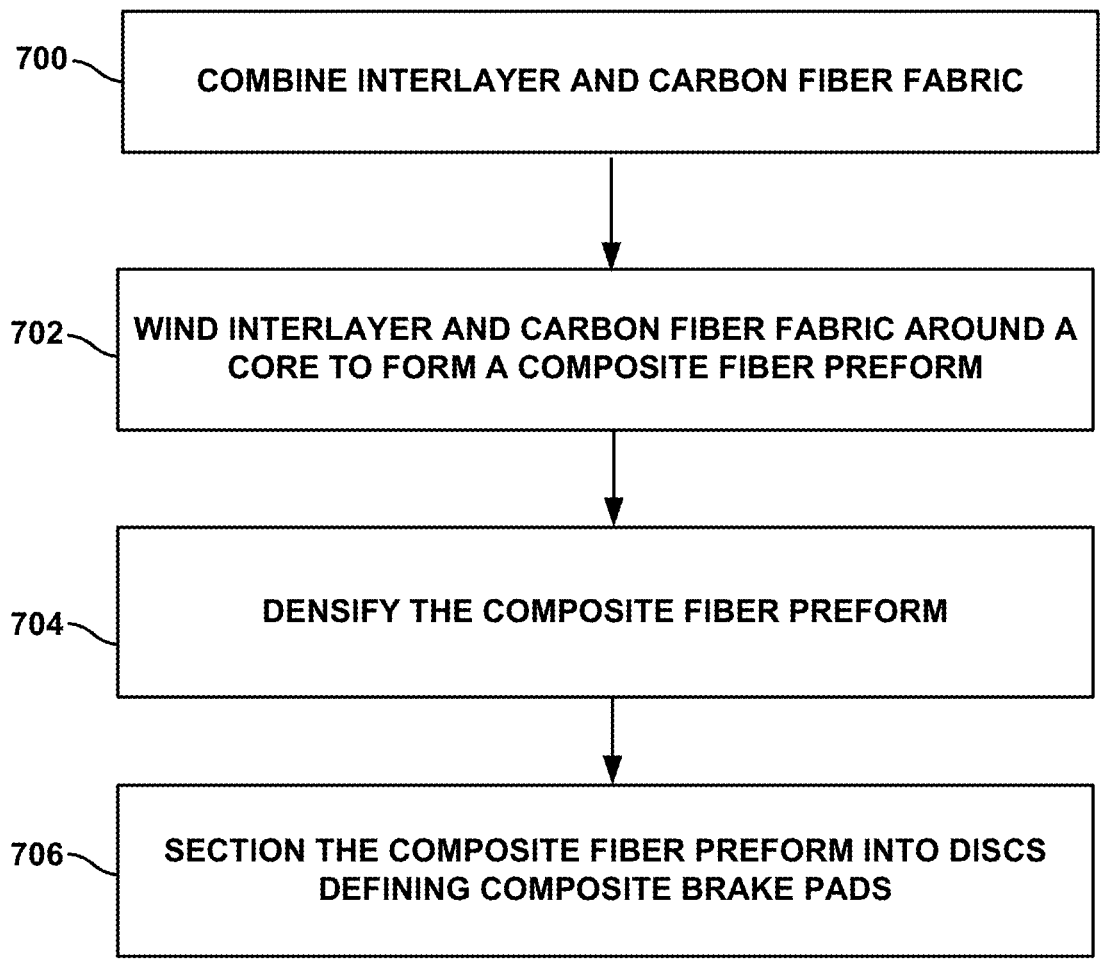
FIG. 8 is a flow diagram illustrating an example technique of manufacturing a composite fiber preform.

The fiber preforms and carbon-carbon composite brake pads described herein may be formed using any suitable technique. FIG. 8 is a flow diagram illustrating an example technique of manufacturing a composite fiber preform and brake pad such as disc brakes 36 and 38 of FIG. 1. The technique illustrated in FIG. 8 is described with reference to composite fiber preform 100 and brake discs 36, 38, fibers 104-108, layers 102, fabric source 402, carbon fiber fabric 412, interlayer source 404, interlayer 414, and radial fibers 408, however, other fiber preforms or brake discs may be formed using the described techniques and composite fiber preform 100 and brake discs 36, 38 may be formed using other techniques.

An interlayer 414 and a carbon fiber fabric 412 may be combined (700). In some examples, the interlayer 414 and carbon fiber fabric 412 may be combined by virtue of both being wound together around a mandrel and/or a core on a mandrel, e.g., via a roll-to-roll process as illustrated in FIG. 4A to form composite fiber preform 100. In other examples, the interlayer 414 and carbon fiber fabric 412 may be combined before winding about the mandrel, e.g., via pressing, tensioning, and/or any other suitable technique for combining the interlayer and the carbon fiber fabric.

In some examples, carbon fiber fabric 412 may comprise a material including in-plane carbon fibers, e.g., a carbon felt and/or a carbon-based felt. In some examples, at least 50% of the carbon fibers of carbon fiber fabric 412 are in-plane fibers such as axial fibers 104 or circumferential fibers 106, e.g., a portion of carbon fibers of the carbon fiber fabric 412 having a substantially in-plane orientation is greater than or equal to about 50%. In some examples, no more than 50% of the carbon fibers of carbon fiber fabric 412 are out-of-plane fibers such as radial fibers 108, e.g., a portion of carbon fibers of the carbon fiber fabric 412 having a substantially out-of-plane orientation is less than or equal to about 50%.

In some examples, interlayer 414 may comprise a plurality of radial fibers 408, e.g., fibers that are "out-of-plane" before being wound, such as a highly oriented milled carbon fiber ply comprising a plurality of out-of-plane fibers. In some examples, at least 50% of the carbon fibers of interlayer 414 are out-of-plane fibers such as radial fibers 108, e.g., a portion of carbon fibers of the interlayer 414 having a substantially out-of-plane (or radial when wound) orientation is greater than or equal to about 50%. In some examples, interlayer 414 may comprise a carrier 418, such as a peel ply backer, which may be removable and which may be removed from the highly oriented milled carbon fiber ply after interlayer 414 and carbon fiber fabric 412 are combined.

Interlayer 414 and carbon fiber fabric 412 may be combined to introduce one or more of the plurality of out-of-plane fibers of interlayer 414 at least partially into the carbon fiber fabric 412, e.g., a carbon felt. Interlayer 414 and a carbon fiber fabric 412 may be combined by bringing the ends of radial fibers 408, e.g., which on the average may comprise a "surface" of interlayer 414, into contact with a surface of carbon fiber fabric 412.

Interlayer 414 and carbon fiber fabric 412 may be wound around a core 410 to form a composite fiber preform 100 (702). In some examples, interlayer 414 and carbon fiber fabric 412 may be wound around a mandrel without a core 410. In some examples, interlayer 414 and carbon fiber fabric 412 may be wound to form alternating layers of interlayer 414 and carbon fiber fabric 412, e.g., such as layers 102 of FIG. 3B. In other examples, additional carbon fiber fabrics 412 and/or interlayers 414, e.g., from additional fabric sources 402 and/or interlayer sources 404, may be combined in any other suitable layer pattern. For example, interlayer 414 and carbon fiber fabric 412 may be combined with two adjacent layers of interlayer 414 alternating with one layer of carbon fiber fabric 412, or interlayer 414 and carbon fiber fabric 412 may be combined with one layer of interlayer 414 alternating with two adjacent layers of carbon fiber fabric 412.

In some examples, winding interlayer 414 and carbon fiber fabric 412 onto core 410 or a mandrel may include selecting an outer diameter of the core 410 or mandrel to correspond to a selected inner diameter ID of composite fiber preform 100. In some examples, winding interlayer 414 and carbon fiber fabric 412 may include controlling a number of windings to achieve a selected outer diameter OD of composite fiber preform 100. In some examples, core 410 may comprise a filament wound carbon tow, and in some examples composite fiber preform 100 may be removable from core 410 or from the mandrel, or core 410 may be removable from the mandrel.

Interlayer 414 and carbon fiber fabric 412 may be consolidated to increase a fiber volume fraction (FVF) of the composite fiber preform 100. For example, interlayer 414 and carbon fiber fabric 412 may be consolidated by controlling a tension of one or both of the interlayer 414 and carbon fiber fabric 412 during combining and/or winding. In some examples, fabric source 402 and interlayer source 404 may be wound on a mandrel, or wound on a core 420 that may be mounted to or on a mandrel. The mandrels may have a braking system, a motor configured to brake, or any other suitable tensioning system. In some examples, a tensioning bar may be used to control a tension of interlayer 414 and/or carbon fiber fabric 412.

In some examples, controlling the tension of at least one of the carbon fiber fabric 412 or the interlayer 414 comprises controlling a percent of a fiber volume relative to a total volume of the fiber preform between about 5% to about 35%, or between about 5% to about 25%. For example, increasing the tension of at least one of the carbon fiber fabric 412 or the interlayer 414 may stretch or increase the length of the carbon fiber fabric 412 or the interlayer 414 in the circumferential direction of composite fiber preform 100 while compressing or decreasing the width/thickness of the carbon fiber fabric 412 or the interlayer 414 in the thickness or radial direction of composite fiber preform 100, thereby increasing the density of carbon fiber fabric 412 or interlayer 414 of composite fiber preform 100. Composite fiber preform 100 may then have an increased amount or volume of carbon fiber content, e.g., either from carbon fiber fabric 412 or interlayer 414, relative to a fiber preform in which the tension is not increased. In other words, tensioning of at least one of the carbon fiber fabric 412 or the interlayer 414 may control the density of the carbon fiber fabric 412 or interlayer 414 wound about composite fiber preform 100 and consequently the density of the carbon fiber content of composite fiber preform 100.

In some examples, a tension of at least one of the carbon fiber fabric 412 or the interlayer 414 may be selected to increase or decrease an amount of radial length that at least one radially oriented carbon fiber extends within the carbon fiber fabric 412. In other words, controlling the tension of at least one of the carbon fiber fabric 412 or the interlayer 414 may control how much length of the radial fibers 408 of interlayer 414 extends into carbon fiber fabric 412. For example, increasing the tension of one of the carbon fiber fabric 412 or the interlayer 414 increases the radial pressure of that particular layer of carbon fiber fabric 412 or the interlayer 414 on the adjacent layer it comes into contact with during winding, thereby forcing a greater amount of the length of radial fibers 408 of the interlayer 414 to extend within the adjacent carbon fiber fabric layer 414.

Generally, controlling the tension of at least one of the carbon fiber fabric 412 or the interlayer 414 may at least partially control compression of layers 102 to form a more compacted composite fiber preform 100, at least partially control an amount of mechanical binding of layers 102 together via radial fibers 108 to layers 102 together, or both. In this way, introducing radial fibers 108 via interlayer 414 and controlling the mechanical binding via tension control during combining or winding may control or increase an interlaminar shear strength of composite fiber preform 100 and/or brake discs 36, 38 produced using composite fiber preform 100.

Although not shown, once composite fiber preform 100 has been formed in the manner described above, the technique may include carbonizing and/or pyrolyzing composite fiber preform 100. Carbonizing and/or pyrolyzing composite fiber preform 100 may convert any carbon-precursor material into carbon through a thermal degradation process to effectively burn off any non-carbon material. For example, composite fiber preform 100 may be carbonized by heating composite fiber preform 100 in a retort under inert or reducing conditions to remove the non-carbon constituents (hydrogen, nitrogen, oxygen, etc.) from fibers 104-108. The carbonization can be carried out using retort, such as an autoclave, a furnace, a hot isostatic press, a uniaxial hot press, or the like. In each of these techniques, composite fiber preform 100 may be heated in the inert atmosphere at a temperature in the range of, e.g., about 600° C. to about 1000° C. while optionally being mechanically compressed. The mechanical compression may be used to define the geometry (e.g., thickness (T)) of composite fiber preform 100. In some examples, the retort may be purged with nitrogen for approximately 1 hour, then heated to about 900° C. over the course of approximately 10 hour to approximately 20 hours, followed by elevating the temperature to about 1050° C. for approximately 1 hour to approximately 2 hours. The retort then may be held at about 1050° C. for approximately 3 hours to approximately 6 hours before the carbonized preform is allowed to cool. In some examples, the carbonization step can be carried out at even higher temperature, including up to about 1800° C. or up to about 2600° C.

After winding, composite fiber preform 100 may be densified (704). For example, composite fiber preform 100 may be subjected to one or more densification cycles to form a C—C composite. Example densification cycles may include, for example, being densified by applying one or more cycles of chemical vapor infiltration and/or chemical vapor deposition (CVI/CVD) of a carbonaceous gas. Any suitable carbonaceous gas may be used during the CVI/CVD processing including, for example, carbon-based gases such as natural gas, methane, ethane, propane, butane, propylene, or acetylene, or a combination thereof. In some examples, the application of the carbonaceous gas to densify a composite fiber preform 100 via CVI/CVD may occur substantially in a vacuum space (e.g., a vessel with an internal environment at less than 100 Torr (e.g., 13.33 kPa)) or under an inert gas environment so as to control the chemical deposition reaction. In some examples, during application of the CVI/CVD gas, the environment including composite fiber preform 100 may be heated to an elevated temperature, for example about 900° C. to about 1200° C., to promote the chemical deposition reaction.

In some examples, axial fibers 104 may increase penetration of the carbonaceous gas into composite fiber preform 100. For example, composite fiber preform 100 having a greater percentage of axial fibers 104 relative to total fibers 104-108 may have better carbonaceous gas penetration compared to a preform with a relatively lower percentage of axial fibers. In some examples, the carbon fibers of carbon fiber fabric 412 may be highly dispersed, e.g., as a carbon felt, and may have a substantially homogeneous porosity structure, which may have improved carbonaceous gas penetration and/or infiltration. Better penetration of the carbonaceous gas may improve a final density and/or reduce total time required for a desired densification.

In other examples, composite fiber preform 100 may be densified using other suitable techniques including for example, resin infiltration and carbonization via resin transfer mold (RTM) processing, vacuum pressure infiltration (VPI) processing, high pressure infiltration (HPI), or the like. In some examples, the densification step (704) may produce a densified C—C composite substrate having a final density of about 1.60 to about 1.95 g/cc, such as about 1.65 to about 1.85 g/cc.

In some examples, composite fiber preform 100 may optionally be wrapped with a compaction layer around the outer diameter of the composite fiber preform 100. The compaction layer may be configured to maintain a compaction of the composite fiber preform, and may comprise a filament wound carbon tow. In some examples, the technique may include thermal cycling composite fiber preform 100 to rigidize at least one of core 410, the composite fiber preform 100, or the compaction layer.

In some examples, before or after any one of carbonizing or densification, composite fiber preform 100 may be sectioned into a plurality of sections having a selected thickness (706). For example, composite fiber preform 100 may be cut using any suitable cutting method to a plurality of sections that, in some examples, may be subsequently carbonized or densified.

In some examples, during or after the densification of composite fiber preform 100, the major friction surfaces of the resultant C—C composite may be machined or sculpted into a desired shape, such as a final brake disc shape. For example, C—C composite substrate may be ground in the shape of a densified C—C composite disc brake having a final thickness T (e.g., about 1.4 inches). Additionally, or alternatively, lug notches 72 may be formed at this time.

In some examples, after densification, the technique may include application of one or more coatings to brake discs 36, 38. For example, the technique may include application of an antioxidant coating, such as phosphorus based penetrant systems and/or barrier systems, to brake discs 36, 38. In some examples, the one or more coatings may improve the performance of brake discs 36, 38 and/or improve a useable life of brake discs 36, 38.

Figure 9:
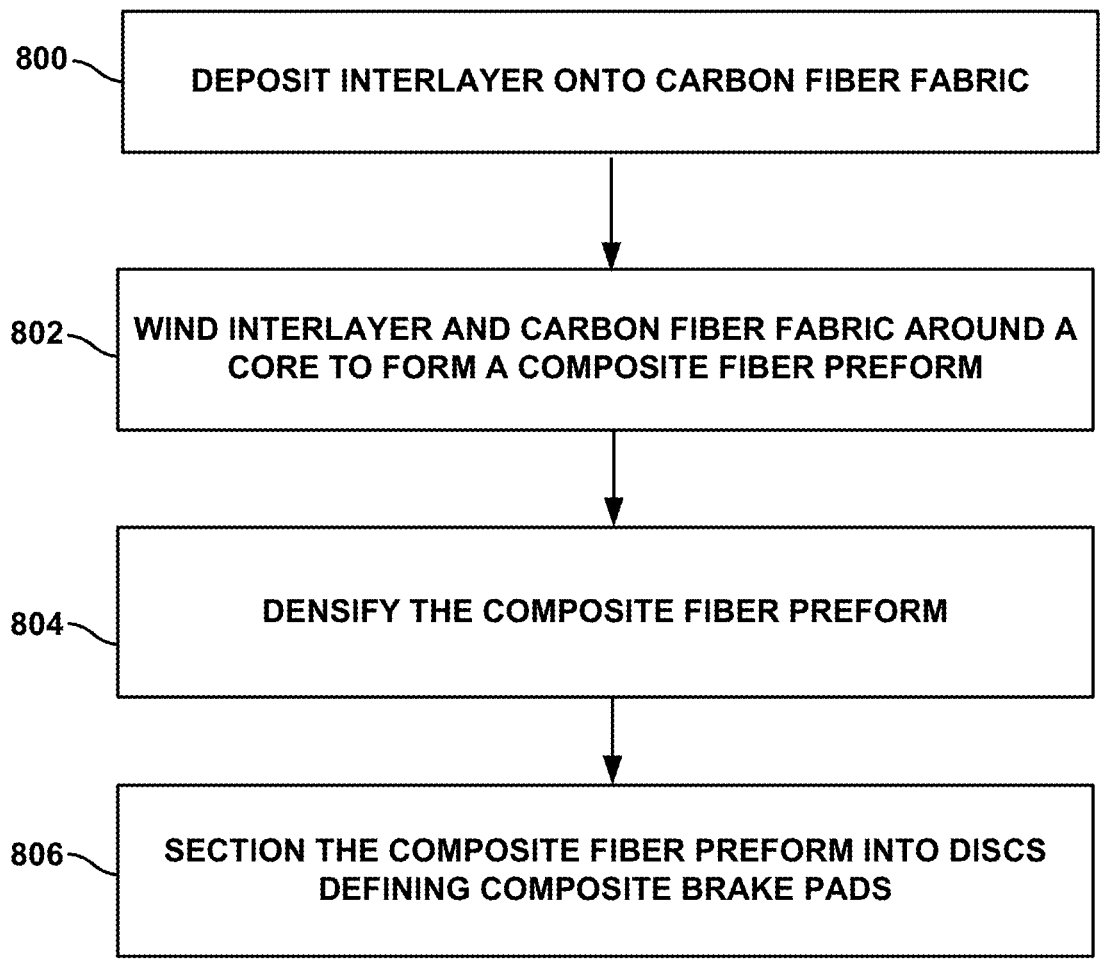
FIG. 9 is a flow diagram illustrating another example technique of manufacturing a composite fiber preform.

FIG. 9 is a flow diagram illustrating another example technique of manufacturing a composite fiber preform and disc brake. The technique illustrated in FIG. 9 is described with reference to composite fiber preform 100 and brake discs 36, 38, fibers 104-108, layers 102, fabric source 452, carbon fiber fabric 462, interlayer source 454, and interlayer 464, however, other fiber preforms or disc brakes may be formed using the described techniques and composite fiber preform 100 and brake discs 36, 38 may be formed using other techniques.

An interlayer 464 may be deposited onto a carbon fiber fabric 462 to form a composite carbon fiber fabric (800). In some examples, interlayer 464 may be a binder 459, and an interlayer source such as coater 454 may deposit the interlayer 464 onto a surface of the carbon fiber fabric 454.

In some examples, carbon fiber fabric 452 may comprise a material including in-plane carbon fibers, e.g., a roll of fiber tow fabric, a carbon nonwoven felt, a carbon knit fabric, carbon woven fabric, a polyacrylonitrile (PAN) fiber, an oxidized PAN fiber such as PANOX®, and the like. In some examples, at least 50% of the carbon fibers of carbon fiber fabric 462 are in-plane fibers such as axial fibers 104 or circumferential fibers 106, e.g., a portion of carbon fibers of the carbon fiber fabric 462 having a substantially in-plane orientation is greater than or equal to about 50%. In some examples, no more than 50% of the carbon fibers of carbon fiber fabric 462 are out-of-plane fibers such as radial fibers 108, e.g., a portion of carbon fibers of the carbon fiber fabric 462 having a substantially out-of-plane orientation is less than or equal to about 50%.

Coater 454 may coat or otherwise deposit interlayer 464 onto a surface of carbon fiber fabric 464. Interlayer 464 may comprise a binder 459, and optionally a plurality of nanoparticles 458 mixed within binder 459. In some examples, coater 454 may be a hopper and may deposit the binder 459 onto a surface of carbon fiber fabric 462. For example, the binder 459 may be a dry powder of binder material, and a hopper may deposit and/or sift the dry binder onto carbon fiber fabric 462. The hopper may be receive and mix nanoparticles 458 with binder 459 and may deposit and/or sift the binder 459 with nanoparticles 458 onto the carbon fiber fabric 462. In some examples, coater 454 may deposit or coat a binder solution onto a surface of carbon fiber fabric 462. For example, a mixer prior to or included with coater 54 may mix the binder 459 with a solvent, such as an organic solvent, methyl ethyl ketone (MEK), acetone or any suitable solvent, to form a binder solution, and coater 454 may coat and/or spray a surface of carbon fiber fabric 462 with the binder solution. A mixer may further mix the binder solution with nanoparticles 458 and coater 454 may coat the binder solution with nanoparticles 458 onto the carbon fiber fabric 462. In some examples, whether deposited as a dry binder or coated as a binder solution, binder 459 may comprise a weight percent (wt %) of the dry carbon fiber fabric 462 between about 20 wt % to about 30 wt %. In some examples, when added to the dry binder or the binder solution, nanoparticles 458 may comprise a weight percent (wt %) of the binder 459 between about 2 wt % to about 10 wt %.

In some examples, nip rollers 466 and/or press roller 468 may compress binder 459 and carbon fiber fabric 462, e.g., whether binder 459 is deposited as a dry binder or coated as a binder solution, and whether binder 459 contains nanoparticles 458 or not. A system, such as system 400, may dry the binder solution, e.g., before or after winding (e.g., at 802). For example, system 400 may include a dryer, or may include a web path in binder 459 air dries, e.g., the solvent has time to evaporate.

Interlayer 464 and carbon fiber fabric 462 may be wound around a core 410 to form a composite fiber preform 100 (802). In some examples, interlayer 464 and carbon fiber fabric 462 may be wound around a mandrel without a core 410. In some examples, interlayer 464 and carbon fiber fabric 462 may be wound to form alternating layers of interlayer 464 and carbon fiber fabric 462, e.g., such as layers 102 of FIG. 3B.

In some examples, winding interlayer 464 and carbon fiber fabric 462 onto core 410 or a mandrel may include selecting an outer diameter of the core 410 or mandrel to correspond to a selected inner diameter ID of composite fiber preform 100. In some examples, winding interlayer 464 and carbon fiber fabric 462 may include controlling a number of windings to achieve a selected outer diameter OD of composite fiber preform 100. In some examples, core 410 may comprise a filament wound carbon tow, and in some examples composite fiber preform 100 may be removable from core 410 or from the mandrel, or core 410 may be removable from the mandrel.

Interlayer 464 and carbon fiber fabric 462 may be consolidated to increase a fiber volume fraction (FVF) of the composite fiber preform 100. For example, interlayer 464 and carbon fiber fabric 462 may be consolidated by controlling a tension of carbon fiber fabric 462 during combining and/or winding. In some examples, fabric source 452 may be wound on a mandrel, or wound on a core 420 that may be mounted to or on a mandrel. The mandrels may have a braking system, a motor configured to brake, or any other suitable tensioning system. In some examples, a tensioning bar may be used to control a tension of carbon fiber fabric 462.

In some examples, controlling the tension of carbon fiber fabric 462 comprises controlling a percent of a fiber volume relative to a total volume of the fiber preform between about 5% to about 35%, or between about 5% to about 25%. For example, increasing the tension of at least one of the carbon fiber fabric 462 or the interlayer 464 may stretch or increase the length of the carbon fiber fabric 462 or the interlayer 464 in the circumferential direction of composite fiber preform 100 while compressing or decreasing the width/thickness of the carbon fiber fabric 462 or the interlayer 464 in the thickness or radial direction of composite fiber preform 100, thereby increasing the density of carbon fiber fabric 462 or interlayer 464 of composite fiber preform 100. After densification, composite fiber preform 100 may then have an increased amount or volume of carbon fiber content, e.g., either from carbon fiber fabric 462 or interlayer 464, relative to a fiber preform in which the tension is not increased. In other words, tensioning of carbon fiber fabric 462 may control the density of the carbon fiber fabric 462 or interlayer 464 wound about composite fiber preform 100 and consequently the density of the carbon fiber content of composite fiber preform 100.

Generally, controlling the tension of carbon fiber fabric 462 may at least partially control compression of layers 102 to form a more compacted composite fiber preform 100, at least partially control an amount of mechanical binding of layers 102 together via binder 459, or both. In this way, controlling the mechanical binding via tension control during combining or winding may control or increase an interlaminar shear strength of composite fiber preform 100 and/or brake discs 36, 38 produced using composite fiber preform 100.

Although not shown, once composite fiber preform 100 has been formed in the manner described above, the technique may include curing interlayer 464, e.g., curing binder 459, after winding. For example, composite fiber preform 100 may be heated to cure binder 459. In some examples, system 400 may cure binder 459 with or without nanoparticles 458. In some examples, curing binder 459 may cause binder 459 to increase adhesion to adjacent layers 102 and increase cohesion of binder 459, thereby increasing an interlaminar shear strength of composite fiber preform 100 and/or brake discs 36, 38 produced using composite fiber preform 100.

The technique may further include carbonizing and/or pyrolyzing composite fiber preform 100. Carbonizing and/or pyrolyzing composite fiber preform 100 may convert any carbon-precursor material into carbon through a thermal degradation process to effectively burn off any non-carbon material. For example, composite fiber preform 100 may be carbonized by heating composite fiber preform 100 in a retort under inert or reducing conditions to remove the non-carbon constituents (hydrogen, nitrogen, oxygen, etc.) from fibers 104-108. The carbonization can be carried out using retort, such as an autoclave, a furnace, a hot isostatic press, a uniaxial hot press, or the like. In each of these techniques, composite fiber preform 100 may be heated in the inert atmosphere at a temperature in the range of, e.g., about 600° C. to about 1000° C. while optionally being mechanically compressed. The mechanical compression may be used to define the geometry (e.g., thickness (T)) of composite fiber preform 100. In some examples, the retort may be purged with nitrogen for approximately 1 hour, then heated to about 900° C. over the course of approximately 10 hour to approximately 20 hours, followed by elevating the temperature to about 1050° C. for approximately 1 hour to approximately 2 hours. The retort then may be held at about 1050° C. for approximately 3 hours to approximately 6 hours before the carbonized preform is allowed to cool. In some examples, the carbonization step can be carried out at even higher temperature, including up to about 1800° C. or up to about 2600° C.

After winding, composite fiber preform 100 may be densified (804). For example, composite fiber preform 100 may be subjected to one or more densification cycles to form a C—C composite. Example densification cycles may include, for example, being densified by applying one or more cycles of chemical vapor infiltration and/or chemical vapor deposition (CVI/CVD) of a carbonaceous gas. Any suitable carbonaceous gas may be used during the CVI/CVD processing including, for example, carbon-based gases such as natural gas, methane, ethane, propane, butane, propylene, or acetylene, or a combination thereof. In some examples, the application of the carbonaceous gas to densify a composite fiber preform 100 via CVI/CVD may occur substantially in a vacuum space (e.g., a vessel with an internal environment at less than 100 Torr (e.g., 13.33 kPa)) or under an inert gas environment so as to control the chemical deposition reaction. In some examples, during application of the CVI/CVD gas, the environment including composite fiber preform 100 may be heated to an elevated temperature, for example about 900° C. to about 1200° C., to promote the chemical deposition reaction.

In some examples, axial fibers 104 may increase penetration of the carbonaceous gas into composite fiber preform 100. For example, composite fiber preform 100 having a greater percentage of axial fibers 104 relative to total fibers 104-108 may have better carbonaceous gas penetration compared to a preform with a relatively lower percentage of axial fibers. In some examples, the carbon fibers of carbon fiber fabric 412 may be highly dispersed, e.g., as a carbon felt, and may have a substantially homogeneous porosity structure, which may have improved carbonaceous gas penetration and/or infiltration. Better penetration of the carbonaceous gas may improve a final density and/or reduce total time required for a desired densification.

In other examples, composite fiber preform 100 may be densified using other suitable techniques including for example, resin infiltration and carbonization via resin transfer mold (RTM) processing, vacuum pressure infiltration (VPI) processing, high pressure infiltration (HPI), or the like. In some examples, the densification step (804) may produce a densified C—C composite substrate having a final density of about 1.60 to about 1.95 g/cc, such as about 1.65 to about 1.85 g/cc.

In some examples, composite fiber preform 100 may be wrapped with a compaction layer around the outer diameter of the composite fiber preform. The compaction layer may be configured to maintain a compaction of the composite fiber preform, and may comprise a filament wound carbon tow. In some examples, the technique may include thermal cycling composite fiber preform 100 to rigidize at least one of core 410, the composite fiber preform 100, or the compaction layer.

In some examples, before or after any one of carbonizing or partial or complete densification, composite fiber preform 100 may be sectioned into a plurality of sections having a selected thickness (806). For example, composite fiber preform 100 may be cut using any suitable cutting method to a plurality of sections that, in some examples, may be subsequently carbonized or densified.

In some examples, during or after the densification of composite fiber preform 100, the major friction surfaces of the resultant C—C composite may be sculpted into a desired shape, such as a final brake disc shape. For example, C—C composite substrate may be ground in the shape of a densified C—C composite disc brake having a final thickness T (e.g., about 1.4 inches). Additionally, or alternatively, lug notches 72 may be formed at this time.

In some examples, after densification, the technique may include application of one or more coatings to disc brake 38. For example, the technique may include application of an antioxidant coating, such as phosphorus based penetrant systems and/or barrier systems, to disc brake 38. In some examples, the one or more coatings may improve the performance of disc brake 38 and/or improve a useable life of disc brake 38.

The following clauses illustrate example subject matter described herein.

Clause 1: A method comprising: combining an interlayer and a carbon fiber fabric, wherein the interlayer comprises a highly oriented milled carbon fiber ply comprising a plurality of out-of-plane carbon fibers; winding the interlayer and the carbon fiber fabric around a core to form a composite fiber preform comprising a plurality of layers defining an annulus extending along a central axis; and densifying the composite fiber preform.

Clause 2: The method of clause 1, wherein the carbon fiber fabric comprises a plurality of carbon fibers, wherein a portion of the plurality of carbon fibers of the carbon fiber fabric having a substantially in-plane orientation is greater than or equal to about 50%, wherein a portion of the plurality of carbon fibers of the carbon fiber fabric having a substantially out-of-plane orientation is less than or equal to about 50%, and wherein the out-of-plane orientation is substantially parallel with a radial orientation of the composite fiber preform.

Clause 3: The method of clause 2, wherein the carbon fiber fabric comprises a carbon felt.

Clause 4: The method of clause 3, wherein combining the interlayer and the carbon fiber fabric comprises combining the interlayer with the carbon felt to introduce one or more of the plurality of out-of-plane carbon fibers at least partially into the carbon felt.

Clause 5: The method of any one of clauses 1 through 4, wherein the interlayer comprises a peel ply backer, the method further comprising removing the peel ply backer from the highly oriented milled carbon fiber ply after the interlayer and the carbon fiber fabric are combined.

Clause 6: The method of any one of clauses 1 through 5, further comprising consolidating the interlayer and the carbon fiber fabric to increase a carbon fiber volume fraction of the composite fiber preform via controlling the tension of at least one of the carbon fiber fabric or the interlayer.

Clause 7: The method of clause 6, wherein controlling the tension of at least one of the carbon fiber fabric or the interlayer comprises controlling the tension such that a percent of a carbon fiber volume relative to a total volume of the composite fiber preform is between about 5% to about 25%.

Clause 8: The method of clause 7, further comprising selecting a tension of at least one of the carbon fiber fabric or the interlayer to increase or decrease an amount of radial length that at least one radially oriented carbon fiber extends within the carbon fiber fabric.

Clause 9: The method of any one of clauses 1 through 8, wherein the core comprises a filament wound carbon tow, wherein the composite fiber preform is removable from the core.

Clause 10: The method of any one of clauses 1 through 9, further comprising wrapping a compaction layer around an outer diameter of the composite fiber preform, wherein the compaction layer is configured to maintain a compaction of the composite fiber preform.

Clause 11: The method of clause 10, where the compaction layer comprises a filament wound carbon tow.

Clause 12: The method of clause 10 or clause 11, further comprising thermal cycling the composite fiber preform to rigidize at least one of the core, the composite fiber preform, or the compaction layer.

Clause 13: The method of any one of clauses 1 through 12, further comprises: carbonizing at least a portion of the composite fiber preform, wherein densifying the composite fiber preform comprises densifying the composite fiber preform via chemical vapor deposition.

Clause 14: The method of any one of clauses 1 through 13, further comprising sectioning the at least partially densified composite fiber preform into one or more discs defining respective composite brake pads or discs.

Clause 15: A composite fiber preform comprises: a carbon fiber fabric; and an interlayer comprising a highly oriented milled carbon fiber ply comprising a plurality of out-of-plane carbon fibers, wherein the interlayer and the carbon fiber fabric are wound around a core to form a composite fiber preform comprising a plurality of layers defining an annulus extending along a central axis, wherein the interlayer and the carbon fiber fabric are at least partially densified.

Clause 16 The composite fiber preform of clause 15, wherein the carbon fiber fabric comprises a plurality of carbon fibers, wherein a portion of the plurality of carbon fibers of the carbon fiber fabric having a substantially in-plane orientation is greater than or equal to about 50%, wherein a portion of the plurality of carbon fibers of the carbon fiber fabric having a substantially out-of-plane orientation is less than or equal to about 50%, and wherein the out-of-plane orientation is substantially parallel with a radial orientation of the composite fiber preform:

Clause 17: The composite fiber preform of clause 16, wherein the carbon fiber fabric comprises a carbon felt.

Clause 18: The composite fiber preform of clause 17, wherein one or more of the plurality of out-of-plane carbon fibers of the interlayer are at least partially introduced into the carbon felt.

Clause 19: The composite fiber preform of any one of clauses 15 through 18, further comprising a compaction layer wrapped around an outer diameter of the composite fiber preform, wherein the compaction layer is configured to maintain a compaction of the composite fiber preform.

Clause 20: A system comprising: a fabric source comprising a carbon fiber fabric; an interlayer source comprising an interlayer comprising a plurality of out-of-plane carbon fibers; and a winding apparatus configured to wind the carbon fiber fabric and the interlayer around a core to form a composite fiber preform and defining an annulus extending along a central longitudinal axis, the composite fiber preform comprising: a plurality carbon fiber fabric layers extending in an axial direction parallel with the longitudinal axis and a circumferential direction perpendicular to both the radial and axial directions, wherein each of the plurality of carbon fiber fabric layers comprises a plurality of elongate carbon fibers oriented substantially parallel with the axial and circumferential directions; and a plurality interlayers extending in an axial direction parallel with the longitudinal axis and a circumferential direction perpendicular to both the radial and axial directions, wherein the plurality of out-of-plane carbon fibers of interlayers are oriented substantially parallel with the radial direction and configured to mechanically bind one or more adjacent carbon fiber fabric layers.

Clause 21: The system of clause 20, further comprising: a motor coupled to a mandrel coupled to the core, wherein the motor is configured to rotate the mandrel; and a controller communicatively coupled to the motor, wherein the controller is configured to control a speed of rotation of the mandrel.

Clause 22: The system of clause 20 or clause 21, wherein the mandrel comprises a graphite mandrel.

Clause 23: The system of any one of clauses 20 through 22, wherein the mandrel comprises a metal rod and a graphite ring coupled to at least a portion of the metal rod.

Clause 24: The system of any one of clauses 20 through 23, wherein the fabric source comprises a second mandrel, wherein the carbon fiber fabric is wound on the second mandrel.

Clause 25: The system of clause 24, further comprising at least one of a tensioner coupled to the second mandrel or a tensioning bar, wherein the tensioner or tensioning bar is configured to, during winding of the carbon fiber fabric onto the first mandrel, control a tension of the carbon fiber fabric.

Clause 26: The system of clause 25, wherein the interlayer source comprises a third mandrel, wherein the interlayer is wound on the third mandrel.

Clause 27: The system of clause 26, further comprising at least one of a tensioner coupled to the third mandrel or a tensioning bar, wherein the tensioner or tensioning bar is configured to, during winding of the interlayer onto the first mandrel, control a tension of the interlayer.

Clause 28: A method comprising: forming an interlayer on a carbon fiber fabric to form a composite fiber fabric, wherein the interlayer comprises a binder; winding the composite fiber fabric and interlayer around a core to form a composite fiber preform comprising a plurality of layers defining an annulus extending along a central axis; and densifying the composite fiber preform.

Clause 29: The method of clause 28, wherein a portion of carbon fibers of the carbon fiber fabric having a substantially in-plane orientation is greater than or equal to about 50%, wherein a portion of carbon fibers of the carbon fiber fabric having a substantially out-of-plane orientation is less than or equal to about 50%, wherein the out-of-plane orientation is parallel with a radial orientation of the composite fiber preform.

Clause 30: The method of clause 28 or 29, wherein the binder comprises at least one of a resin, a thermoset resin, or a phenolic resin.

Clause 31: The method of any one of clauses 28 through 30, wherein depositing the interlayer comprises: depositing the binder in a dry powder form onto the carbon fiber fabric; compressing the binder to the carbon fiber fabric prior to winding the composite fiber fabric; and curing, after winding, the binder.

Clause 32: The method of any one of clauses 28 through 31, wherein the interlayer comprises a plurality of nanoparticles in the binder, the method further comprising blending the plurality of nanoparticles with the binder prior to depositing the interlayer.

Clause 33: The method of clause 32, wherein the plurality of nanoparticles comprise at least one of a carbon nanotube, a carbon nanofiber, or a graphene nanoplatelet.

Clause 34: The method of any one of clauses 28 through 33, wherein depositing the interlayer comprises: mixing the binder with a solvent to form a binder solution; coating a surface of the carbon fiber fabric with the binder solution; compressing the binder to the carbon fiber fabric prior to winding the composite fiber fabric; drying the binder solution; and curing, after winding, the binder.

Clause 35: The method of clause 34, further comprising mixing a plurality of nanoparticles with the binder solution prior to coating the binder.

Clause 36: The method of any one of clauses 28 through 35, further comprising consolidating the interlayer and the carbon fiber fabric to increase a carbon fiber volume fraction of the composite fiber preform via controlling the tension of the composite carbon fiber fabric.

Clause 37: The method of clause 36, wherein controlling the tension of the composite carbon fiber fabric comprises controlling a percent of a carbon fiber volume relative to a total volume of the composite fiber preform between about 5% to about 35%.

Clause 38: The method of any one of clauses 28 through 37, wherein the core comprises a filament wound carbon tow, wherein the composite fiber preform is removable from the core.

Clause 39: The method of any one of clauses 28 through 38, further comprising wrapping a compaction layer around an outer diameter of the composite fiber preform, wherein the compaction layer is configured to maintain a compaction of the composite fiber preform, wherein the compaction layer comprises a filament wound carbon tow.

Clause 40: The method of clause 39, further comprising thermal cycling the composite fiber preform to rigidize at least one of the core, the composite fiber preform, or the compaction layer.

Clause 41: The method of any one of clauses 28 through 41, further comprising: carbonizing at least a portion of the composite fiber preform, wherein densifying the composite fiber preform comprises densifying the composite fiber preform via chemical vapor deposition.

Clause 42: The method of any one of clauses 28 through 42, further comprising sectioning the at least partially densified composite fiber preform into one or more discs defining respective composite brake pads or discs.

Clause 43: A composite fiber preform comprises: a plurality carbon fiber fabric layers wrapped circumferentially about a longitudinal axis and extending in an axial direction parallel with the longitudinal axis, wherein each of the plurality of carbon fiber fabric layers comprises a plurality of elongate carbon fibers; and a plurality interlayers wrapped circumferentially about the longitudinal axis and extending in the axial direction, wherein each of the plurality of interlayers are disposed between successive layers of the plurality of carbon fabric layers and comprise a binder configured to mechanically bind one or more adjacent carbon fiber fabric layers.

Clause 44: The composite fiber preform of clause 43, wherein the binder comprises at least one of a resin, a thermoset resin, or a phenolic resin.

Clause 45: The composite fiber preform of any of clause 43 or clause 44, wherein the binder comprises a plurality of nanoparticles.

Clause 46: The composite fiber preform of clause 45, wherein the plurality of nanoparticles comprise at least one of a carbon nanotube, a carbon nanofiber, or a graphene nanoplatelet.

Clause 47: A system comprises: a fabric source comprising a carbon fiber fabric; an interlayer source; and a winding apparatus configured to wind the carbon fiber fabric and the interlayer around a core to form a composite fiber preform and defining an annulus extending along a central longitudinal axis, the fiber preform comprising: a plurality carbon fiber fabric layers extending in an axial direction parallel with the longitudinal axis and a circumferential direction perpendicular to both the radial and axial directions, wherein each of the plurality of carbon fiber fabric layers comprises a plurality of elongate carbon fibers; and a plurality interlayers extending in an axial direction parallel with the longitudinal axis and a circumferential direction perpendicular to both the radial and axial directions, wherein the interlayer comprises a binder configured to mechanically bind one or more adjacent carbon fiber fabric layers.

Clause 48: The system of clause 47, further comprising: a motor coupled to a mandrel coupled to the core, wherein the motor is configured to rotate the mandrel; and a controller communicatively coupled to the motor, wherein the controller is configured to control a speed of rotation of the mandrel.

Clause 49: The system of clause 48, further comprising at least one of a tensioner configured to, during winding of the carbon fiber fabric onto the first mandrel, control a tension of the carbon fiber fabric.

Various examples have been described. These and other examples are within the scope of the following claims.

What is claimed is:

1. A method comprising:
   forming an interlayer on a carbon fiber fabric to form a composite fiber fabric, wherein the interlayer comprises a binder;
   winding the composite fiber fabric around a core to form a composite fiber preform comprising a plurality of layers defining an annulus extending along a central axis, wherein the interlayer is formed on the carbon fiber fabric without needling and prior to winding the composite fiber fabric, wherein a portion of carbon fibers of the carbon fiber fabric having a substantially in-plane orientation is greater than or equal to about 50%, wherein a portion of carbon fibers of the carbon fiber fabric having a substantially out-of-plane orientation is less than or equal to about 50%, wherein the out-of-plane orientation is parallel with a radial orientation of the composite fiber preform; and
   densifying the composite fiber preform.

2. The method of claim 1, wherein the binder comprises at least one of a resin, a thermoset resin, or a phenolic resin.

3. The method of claim 1, wherein depositing the interlayer comprises:
depositing the binder in a dry powder form onto the carbon fiber fabric;
compressing the binder to the carbon fiber fabric prior to winding the composite fiber fabric; and
curing, after winding, the binder.

4. The method of claim 1, wherein the interlayer comprises a plurality of nanoparticles in the binder, the method further comprising blending the plurality of nanoparticles with the binder prior to depositing the interlayer.

5. The method of claim 4, wherein the plurality of nanoparticles comprise at least one of a carbon nanotube, a carbon nanofiber, or a graphene nanoplatelet.

6. The method of claim 1, wherein depositing the interlayer comprises:
mixing the binder with a solvent to form a binder solution;
coating a surface of the carbon fiber fabric with the binder solution;
compressing the binder to the carbon fiber fabric prior to winding the composite fiber fabric;
drying the binder solution; and
curing, after winding, the binder.

7. The method of claim 6, further comprising mixing a plurality of nanoparticles with the binder solution prior to coating the binder.

8. The method of claim 1, further comprising consolidating the interlayer and the carbon fiber fabric to increase a carbon fiber volume fraction of the composite fiber preform via controlling a tension of the composite carbon fiber fabric.

9. The method of claim 8, wherein controlling the tension of the composite carbon fiber fabric comprises controlling a percent of a carbon fiber volume relative to a total volume of the composite fiber preform between about 5% to about 35%.

10. The method of claim 1, wherein the core comprises a filament wound carbon tow, wherein the composite fiber preform is removable from the core.

11. The method of claim 1, further comprising wrapping a compaction layer around an outer diameter of the composite fiber preform, wherein the compaction layer is configured to maintain a compaction of the composite fiber preform, wherein the compaction layer comprises a filament wound carbon tow.

12. The method of claim 11, further comprising thermal cycling the composite fiber preform to rigidize at least one of the core, the composite fiber preform, or the compaction layer.

13. The method of claim 1, further comprising:
carbonizing at least a portion of the composite fiber preform,
wherein densifying the composite fiber preform comprises densifying the composite fiber preform via chemical vapor deposition.

14. The method of claim 1, further comprising sectioning the densified composite fiber preform into one or more discs defining respective composite brake pads or discs.

15. A system comprising:
a fabric source comprising a carbon fiber fabric;
an interlayer source configured to form an interlayer on the carbon fiber fabric without needling and prior to winding the carbon fiber fabric and the interlayer, wherein a portion of carbon fibers of the carbon fiber fabric having a substantially in-plane orientation is greater than or equal to about 50%, wherein a portion of carbon fibers of the carbon fiber fabric having a substantially out-of-plane orientation is less than or equal to about 50%, wherein the out-of-plane orientation is parallel with a radial orientation of the carbon fiber fabric; and
a winding apparatus configured to wind the carbon fiber fabric and the interlayer around a core to form a composite fiber preform and defining an annulus extending along a central longitudinal axis, the fiber preform comprising:
a plurality carbon fiber fabric layers extending in an axial direction parallel with the longitudinal axis and a circumferential direction perpendicular to both the radial and axial directions, wherein each layer of the plurality of carbon fiber fabric layers comprises a plurality of elongate carbon fibers; and
a plurality interlayers extending in an axial direction parallel with the longitudinal axis and a circumferential direction perpendicular to both the radial and axial directions, wherein the interlayer comprises a binder configured to mechanically bind one or more adjacent carbon fiber fabric layers.

* * * * *